(12) United States Patent
Shamoto

(10) Patent No.: US 9,703,281 B2
(45) Date of Patent: Jul. 11, 2017

(54) TOOL PATH GENERATION DEVICE, TOOL PATH CALCULATION METHOD, AND TOOL PATH GENERATION PROGRAM

(75) Inventor: Eiji Shamoto, Nagoya (JP)

(73) Assignees: Okuma Corporation, Niwa-Gun (JP); National University Corporation Nagoya University, Nagoya-Shi (JP)

( * ) Notice: Subject to any disclaimer, the term of this patent is extended or adjusted under 35 U.S.C. 154(b) by 1105 days.

(21) Appl. No.: 13/638,325

(22) PCT Filed: Mar. 29, 2011

(86) PCT No.: PCT/JP2011/057801
§ 371 (c)(1),
(2), (4) Date: Nov. 7, 2012

(87) PCT Pub. No.: WO2011/122621
PCT Pub. Date: Oct. 6, 2011

(65) Prior Publication Data
US 2013/0046405 A1    Feb. 21, 2013

(30) Foreign Application Priority Data
Mar. 30, 2010 (JP) .................................. 2010-078131

(51) Int. Cl.
*G05B 19/404* (2006.01)

(52) U.S. Cl.
CPC .. *G05B 19/404* (2013.01); *G05B 2219/42344* (2013.01)

(58) Field of Classification Search
CPC ................ G05B 19/404; G05B 2219/42344

USPC ................................ 700/174–178, 190, 280
See application file for complete search history.

(56) References Cited

U.S. PATENT DOCUMENTS

| | | | |
|---|---|---|---|
| 6,501,997 B1 * | 12/2002 | Kakino | 700/28 |
| 7,341,410 B2 * | 3/2008 | Hill | B23Q 17/0971 409/234 |
| 9,008,823 B2 * | 4/2015 | Wang et al. | 700/175 |
| 2010/0034609 A1 * | 2/2010 | Doppenberg | 409/131 |
| 2012/0065766 A1 * | 3/2012 | Yoshino et al. | 700/173 |
| 2012/0109360 A1 * | 5/2012 | Nishimura et al. | 700/180 |
| 2012/0221139 A1 * | 8/2012 | Kido | 700/159 |
| 2012/0253708 A1 * | 10/2012 | Tanaka | 702/56 |
| 2015/0306720 A1 * | 10/2015 | Ono | B23Q 15/12 700/174 |

(Continued)

FOREIGN PATENT DOCUMENTS

| | | |
|---|---|---|
| JP | 49-001990 U | 1/1974 |
| JP | 2-000049 U | 1/1990 |

(Continued)

OTHER PUBLICATIONS

International Search Report dated Jun. 28, 2011.
(Continued)

*Primary Examiner* — Sean Shechtman
*Assistant Examiner* — Jennifer L Norton
(74) *Attorney, Agent, or Firm* — Burr & Brown, PLLC

(57) ABSTRACT

A tool path generation device that calculates a tool path to be used by a machine tool device, and that provides a high machining efficiency with suppressed occurrence of chatter vibration by calculating machining conditions in consideration of a chatter vibration increase and decrease affecting value that affects increase and decrease in chatter vibration.

19 Claims, 19 Drawing Sheets

(56) References Cited

U.S. PATENT DOCUMENTS

| | | | |
|---|---|---|---|
| 2015/0352713 A1* | 12/2015 | Takazakura | B23B 37/00 173/2 |
| 2016/0252896 A1* | 9/2016 | Nakamura | G05B 19/416 |
| 2016/0320772 A1* | 11/2016 | Ono | G05B 19/40938 |
| 2017/0068773 A1* | 3/2017 | Wang | G06F 17/11 |

FOREIGN PATENT DOCUMENTS

| | | | |
|---|---|---|---|
| JP | 2002-108426 A1 | 4/2002 | |
| JP | 2005-074569 A1 | 3/2005 | |

OTHER PUBLICATIONS

Koichi Akazawa et al., "*Study on Regenerative Chatter Vibration in Ball End Milling of Low Rigidity Workpieces—Construction of Analytical Model with Consideration of Tool Inclination around Cutting Feed Direction,*" Journal of the Japan Society for Precision Engineering, vol. 75, No. 8, 2009, pp. 984-989.

E. Shamoto et al., "*Analytical Prediction of Chatter Stability in Ball End Milling with Tool Inclination,*" CIRP Annals—Manufacturing Technology, vol. 58, No. 1, 2009, pp. 351-354.

Japanese Office Action (Application No. 2010-078131) dated Nov. 12, 2013.

Japanese Office Action (Application No. 2010-078131) dated Apr. 1, 2014.

\* cited by examiner

FIG. 9( b )
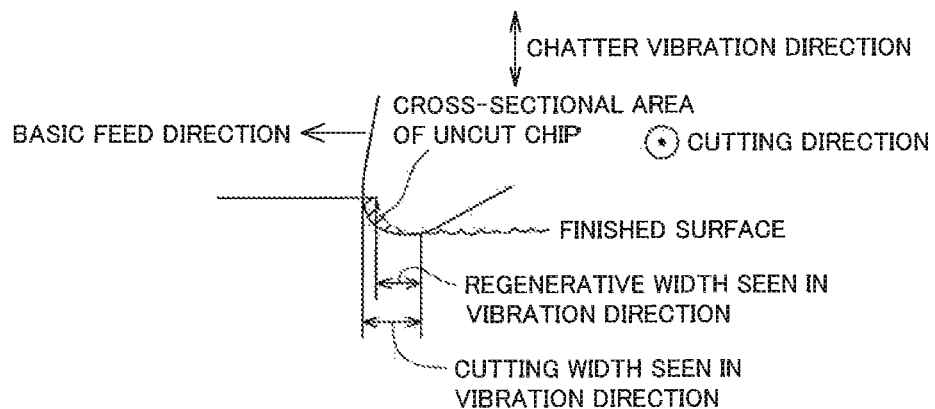

FIG. 11( a )
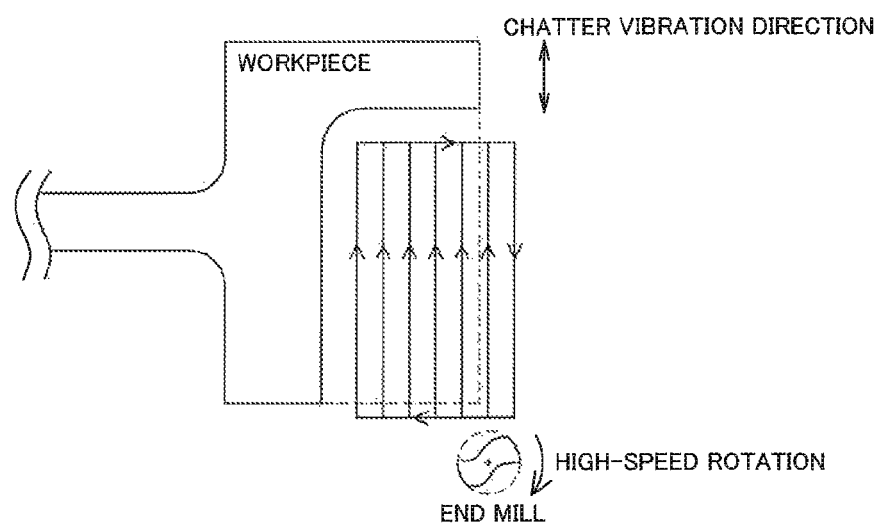

FIG. 11( b )
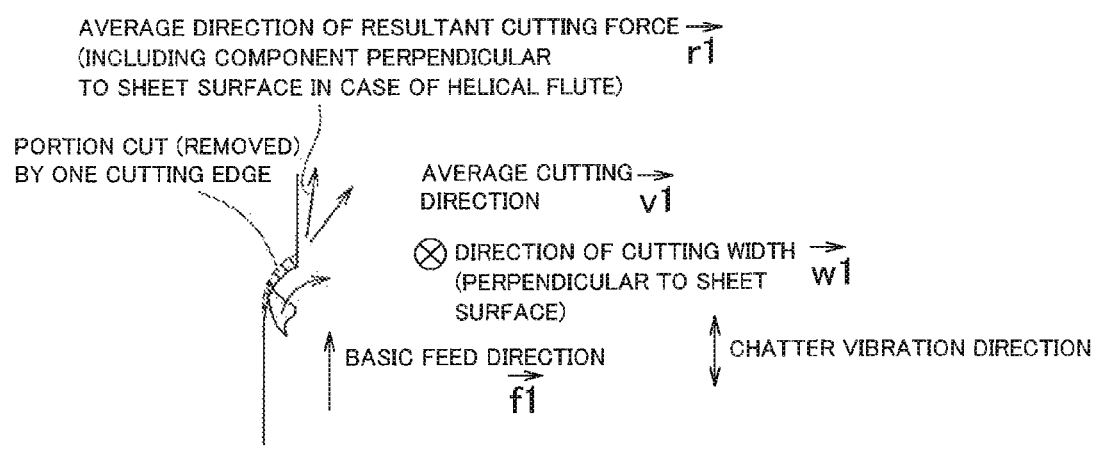

TOOL PATH GENERATION DEVICE, TOOL PATH CALCULATION METHOD, AND TOOL PATH GENERATION PROGRAM

BACKGROUND OF THE INVENTION

Field of the Invention

The present invention relates to a tool path generation device, a tool path calculation method, and a tool path generation program for calculation of a tool path.

Description of Related Art

In machining systems, as described in Patent Document 1, for example, the shape of a part to be manufactured is designed using CAD, and when the resulting CAD data are input to a tool path generation device together with data on a tool to be used (the type and the diameter of the tool) etc., the tool path generation device prepares a tool path (tool path) etc. The prepared tool path etc. is input to an NC program preparation device, which prepares an NC program after the type of the machine tool, detailed information on the tool (projection amount and tooling), the type of the fixation jig, etc. are specified. The prepared NC program is transferred to a machine tool device to perform machining. In some tool path generation devices of recent years, the machining resistance (which is calculated as the product of the specific cutting resistance and the cross-sectional area of an uncut chip) of a workpiece against a tool is predicted, and a tool path is calculated so as to achieve the maximum machining efficiency in such a range that the maximum machining resistance allowed for the machine tool device is not exceeded. This is because a large machining resistance may constitute obstacles to actual machining, such as chipping a tool or stopping the machine with the machining resistance exceeding the power of the machine tool device. Thus, in the machining systems, it is very useful to calculate a tool path in consideration of the machining resistance in order to achieve the maximum machining efficiency.

CITATION LIST

Patent Literature

[Patent Document 1] Japanese Patent Application Publication No. 2002-108426 (JP 2002-108426 A)

SUMMARY OF THE INVENTION

Technical Problem

In actual machining, however, the upper limit of the machining efficiency is occasionally decided by the effect of chatter vibration, rather than the effect of the machining resistance. In the case where a working object with low rigidity is to be machined, in the case where the tool has low rigidity, in the case where the cutting width is large, in the case where the tool has a multiplicity of blades, or the like, the effect of chatter vibration tends to be caused at machining efficiencies lower than those at which the tool is chipped or the machine is stopped because of the machining resistance. Chatter vibration may cause problems such as degrading the quality of the cut surface. Therefore, it is necessary to take measures such as lowering the rotational speed of the tool in the case where chatter vibration is caused. If the machining conditions are set to be low for some locations of machining at which chatter vibration may be caused or in order to ensure excessive safety, however, the entire part is machined at an unnecessarily low machining efficiency, which makes it difficult to enhance the machining efficiency at which the part is machined.

The present invention has been made to address the foregoing issues, and therefore it is an object thereof to obtain a tool path that provides a high machining efficiency with suppressed occurrence of chatter vibration by deciding machining conditions in consideration of a chatter vibration increase and decrease affecting value that affects increase and decrease in chatter vibration.

Solution to Problem

The present invention has been devised to achieve the foregoing object, and provides a tool path generation device that calculates a tool path to be used by a machine tool device that machines a workpiece using at least one tool, including an affecting value calculation section that calculates a chatter vibration increase and decrease affecting value that affects increase and decrease in chatter vibration caused in a structure formed by the tool, the workpiece, and the machine tool device, a machining condition decision section that decides machining conditions on the basis of the chatter vibration increase and decrease affecting value calculated by the affecting value calculation section, and a tool path calculation section that calculates the tool path on the basis of the machining conditions decided by the machining condition decision section.

Advantageous Effects of the Invention

According to the configuration described above, a tool path is calculated using machining conditions decided on the basis of the chatter vibration increase and decrease affecting value. Consequently, a reduction in machining efficiency due to the effect of chatter vibration is avoided. Therefore, the machining efficiency of machining can be improved, and a tool path that provides a high machining efficiency can be calculated.

DETAILED DESCRIPTION OF THE INVENTION

Figure 1:
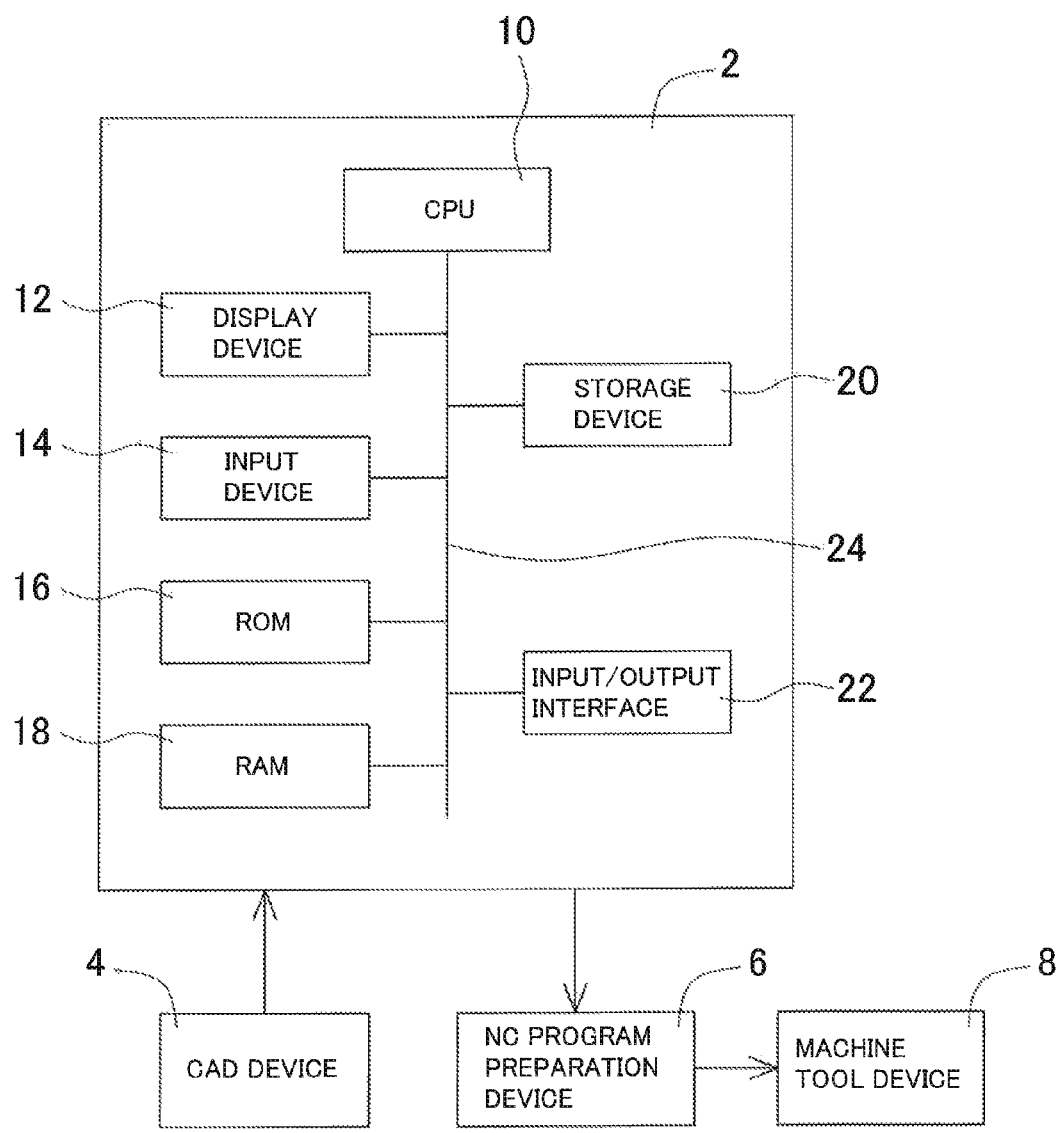
FIG. 1 is a schematic diagram showing the relationship between a tool path generation device 2 according to a first embodiment of the present invention and devices associated with the tool path generation device 2.

Aspects of inventions recognized as patentable in the present application (hereinafter occasionally referred to as "patentable inventions", which may include at least the "present invention" and the "invention according to the present application" described in the claims, and inventions according to subordinate concepts, superordinate concepts, and separate concepts of the invention according to the present application) will be enumerated and described below. As with the claims, the aspects are divided into articles, which are numbered and described with reference to the number of other articles as necessary. This is intended to facilitate understanding the patentable inventions, and not to limit the combination of constituent elements forming the patentable inventions to those described in the following articles. That is, the patentable inventions should be interpreted in consideration of the description accompanying the articles, the description of embodiments, the description of the related art, etc., and aspects obtained by adding another constituent element to the aspects in the articles and by removing a constituent element from the aspects in the articles may also form aspects of the patentable inventions as long as such aspects conform to the interpretation.

In the following articles, the article (1) corresponds to claim 1, the article (2) corresponds to claim 2, the article (3) corresponds to claim 3, the article (4) corresponds to claim 4, the article (5) corresponds to claim 5, the article (6) corresponds to claim 6, the article (7) corresponds to claim 7, the article (8) corresponds to claim 8, the article (9) corresponds to claim 9, the article (10) corresponds to claim 10, the article (11) corresponds to claim 11, the article (12) corresponds to claim 12, the article (13) corresponds to claim 13, the article (14) corresponds to claim 14, the article (15) corresponds to claim 15, the article (16) corresponds to claim 16, the article (17) corresponds to claim 17, the article (18) corresponds to claim 18, the article (19) corresponds to claim 19, and the article (37) corresponds to claim 20.

(1) A tool path generation device that calculates a tool path to be used by a machine tool device that machines a workpiece using at least one tool, characterized by including an affecting value calculation section that calculates a chatter vibration increase and decrease affecting value that affects increase and decrease in chatter vibration caused in a structure formed by the tool, the workpiece, and the machine tool device, a machining condition decision section that decides machining conditions on the basis of the chatter vibration increase and decrease affecting value calculated by the affecting value calculation section, and a tool path calculation section that calculates the tool path on the basis of the machining conditions decided by the machining condition decision section.

According to the configuration, a tool path is calculated using machining conditions decided on the basis of the chatter vibration increase and decrease affecting value. Consequently, a reduction in machining efficiency due to the effect of chatter vibration is avoided. Therefore, the machining efficiency of machining can be improved, and a tool path that provides a high machining efficiency can be calculated. The term "machining conditions" used in (1) refers to conditions needed to calculate a tool path. Examples of the machining conditions include a feed direction, a cutting depth, a rotational speed of a tool or a workpiece, a feed rate (feed rate per cutting edge or rotation for end milling, feed rate per rotation for turning, and feed rate per path for planing and shaping, a pick feed is further included for end milling), an attitude of a tool with respect to a workpiece (for end milling, an angle by which the rotational axis of a tool is tilted about the feed direction and the pick feed direction with respect to a machined surface (surface including the feed direction and the pick feed direction)). The tool path generation device has a CAM (Computer Aided Manufacturing) function, and may be software having the CAM function itself, or may be implemented by software having the CAM function and a computer that executes the software. The tool path generation device may be an element included in a machine tool device (called an automatic programming, for example). The term "CAM function" refers to a function for generating information on at least a tool path on the basis of a machining shape. The tool path generation device may also include a function for designing a machining shape (CAD (Computer Aided Design) function). The term "chatter vibration" means vibration caused in a machine tool device (including a tool and a workpiece) during cutting. In particular, the term "chatter vibration" refers to vibration caused in the case where a closed loop in which vibration is caused in a workpiece, a tool, or a machine tool, a cutting force is fluctuated by increase and decrease in cross-sectional area of an uncut chip of the workpiece caused by the vibration, and vibration is caused again by the fluctuations in cutting force is unstable (in the case where vibration is amplified through the closed loop). Such chatter vibration may be called chatter vibration of the self-excited type.

The machine tool device performs machining. The machine tool device may be configured to internally have an NC program control function for executing an NC program. Alternatively, an NC control function may be provided in an NC control device of another device, and the machine tool device may be configured to perform machining under control by the NC control device. The term "machining efficiency" of the machine tool device refers to the amount by which the tool cuts the workpiece per unit time. The machining efficiency is higher as a larger amount is cut.

A rotary tool, a turning tool, a planing or shaping tool, etc. may be used as the tool for machining the workpiece. A ball end mill and a square end mill may be used as the rotary tool. A tool bit etc. may be used as the turning tool or the planing or shaping tool.

(2) The tool path generation device according to (1), in which the affecting value calculation section calculates, as the chatter vibration increase and decrease affecting value, a magnitude of a cutting width or a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool.

In deciding machining conditions, in the case where the direction of chatter vibration is not specified or estimated, the cross-sectional area of the uncut chip seen in the cutting direction is considered by assuming that the direction of chatter vibration is such a direction that chatter vibration is increased to the greatest degree (here, such a direction that fluctuations in cutting force become the largest). The cross-sectional area of the uncut chip can be represented by the product of a cutting width and a cutting thickness. The cutting width is the width of a contour portion (a portion involved by the current cutting edge), of a portion (cross section of the uncut chip) cut in current rotation (cutting feed in planing or shaping), representing a surface newly generated as a result of current rotation. The cutting thickness is the average thickness in the direction perpendicular to the cutting width. Therefore, chatter vibration is increased to the greatest degree in the direction of the cutting thickness, and increase and decrease in cross-sectional area of the uncut chip due to the current cutting are proportional to the cutting width. Thus, the effect of increase and decrease in chatter vibration can be considered by evaluating the magnitude of the cutting width. Therefore, it is possible to calculate a tool path that provides a high machining efficiency with suppressed occurrence of chatter vibration. A regenerative width may be utilized in place of the cutting width. The regenerative width is the width of a contour portion (a portion involved by the previous cutting edge), of the cross section of the uncut chip, representing a surface generated in the previous cutting. This is because chatter vibration which is problematic in practical use is often of the regenerative type which is due to the regenerative effect, and even if vibration should be caused in the previous cutting, variations (regenerative effect) in current cross-sectional area of the uncut chip due to the vibration are small in the case where the regenerative width is small.

(3) The tool path generation device according to (2), in which the affecting value calculation section calculates the magnitude of the cutting width or the regenerative width as the chatter vibration increase and decrease affecting value in the case where none of vibration characteristics of the structure, a direction of the chatter vibration, and a magnitude and a direction of a specific cutting resistance of the workpiece are specified or estimated.

In deciding machining conditions, in the case where none of the vibration characteristics of the structure, the direction of the chatter vibration, and the magnitude and the direction of the specific cutting resistance of the workpiece are specified or estimated, the direction of chatter vibration cannot be specified or estimated. Therefore, occurrence of chatter vibration can be avoided by assuming that the direction of chatter vibration is such a direction that chatter vibration is increased to the greatest degree. Consequently, a tool path that provides a relatively high machining efficiency with suppressed occurrence of chatter vibration can be calculated.

(4) The tool path generation device according to (2) or (3), in which a machining system has high stability in the case where the magnitude of the cutting width or the regenerative width is small compared to a case where the magnitude of the cutting width or the regenerative width is large.

This enables machining conditions to be decided after the stability of chatter vibration is evaluated on the basis of the magnitude of the cutting width or the regenerative width. Thus, it is possible to calculate a tool path that provides a high machining efficiency with suppressed occurrence of chatter vibration.

(5) The tool path generation device according to (1), in which the affecting value calculation section calculates, as the chatter vibration increase and decrease affecting value, a magnitude of a chatter vibration increase width that is based on at least one of a first angle formed between
        both
            (a) a cutting direction of the tool, and
            (b) a direction between a direction of extension of a cutting width and a direction of extension of a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool, that is, a plane including both the direction (a) and the direction (b), and
        a direction of the chatter vibration, and
    a second angle formed between a plane perpendicular to a direction of a resultant cutting force applied from the tool to the workpiece during machining, and the direction of the chatter vibration.

In the case where the direction of chatter vibration is a particular direction for the current machining conditions, an increase in chatter vibration is suppressed. That is, an increase in chatter vibration is suppressed in the case where the direction of chatter vibration is included in, or forms a small angle with, either of (A) a plane including both (a) a cutting direction of the tool, and (b) a direction of extension of a cutting width and a direction of extension of a regenerative width, the cutting width and the regenerative width being included in a cross section of an uncut chip of the workpiece which is cut by the tool and which is perpendicular to a cutting direction, the cutting width being a width of a contour portion representing a surface generated as a result of current cutting, and the regenerative width being a width of a contour portion representing a surface generated as a result of previous cutting, and (B) a plane perpendicular to a direction of a resultant cutting force applied from the tool to the workpiece during machining. Thus, chatter vibration can be evaluated by calculating a value based on the angle formed between the direction of chatter vibration and the plane (A) or (B). This makes it possible to calculate a tool path that provides a high machining efficiency with suppressed occurrence of chatter vibration.

In addition, it is also possible to decide machining conditions that provide high chatter vibration stability by deciding the chatter vibration increase width only in consideration of at least one of the first angle and the second angle and in no consideration of the magnitude of the cutting width (with the magnitude of the cutting width set to a constant value, for example). This is because an increase in chatter vibration is suppressed in the case where at least one of the first angle and the second angle is small, which enhances the stability of the machining system.

(6) The tool path generation device according to (5), in which the chatter vibration increase width is calculated on the basis of at least one the first angle and the second angle and a magnitude of the cutting width or the regenerative width.

The cross-sectional area of the uncut chip with which the tool cuts the workpiece in the current cutting is fluctuated in accordance with the magnitude of the cutting width or the regenerative width, and the magnitude of the cutting width or the regenerative width affects an increase in chatter vibration. Thus, chatter vibration can be evaluated by calculating the chatter vibration increase width on the basis of one of the first angle and the second angle and the magnitude of the cutting width or the regenerative width. Consequently, a tool path that provides a high machining efficiency with suppressed occurrence of chatter vibration can be obtained.

(7) The tool path generation device according to (5) or (6), in which the affecting value calculation section calculates the magnitude of the chatter vibration increase width as the chatter vibration increase and decrease affecting value in the case where at least the direction of the chatter vibration or vibration characteristics of the structure are specified or estimated.

In the case where the direction of chatter vibration is specified, the angle formed between the particular plane (plane (A) or (B)) determined in accordance with the machining conditions and the direction of chatter vibration can be made small. Thus, it is possible to calculate a tool path that provides a high machining efficiency with suppressed occurrence of chatter vibration. In the case where the vibration characteristics of the structure are specified, meanwhile, the direction of chatter vibration can be extracted from the vibration characteristics. In calculating the magnitude of the chatter vibration increase width, the vibration characteristics of the structure or the direction of chatter vibration and at least one of the magnitude and the direction of the specific cutting resistance may be specified or estimated, in addition to a case where the direction of chatter vibration or the vibration characteristics of the structure are specified or estimated.

(8) The tool path generation device according to any one of (5) to (7), in which a machining system has high stability in the case where the magnitude of the chatter vibration increase width is small compared to a case where the magnitude of the chatter vibration increase width is large.

This enables machining conditions to be decided after the stability of chatter vibration is evaluated on the basis of the chatter vibration increase width. Thus, it is possible to calculate a tool path that provides a high machining efficiency with suppressed occurrence of chatter vibration.

(9) The tool path generation device according to (1), in which the affecting value calculation section calculates a magnitude of a machining process gain of a machining system of the structure as the chatter vibration increase and decrease affecting value.

The magnitude of the machining process gain of the machining system affects an increase in chatter vibration. Thus, chatter vibration can be evaluated by calculating the magnitude of the machining process gain as the chatter vibration increase and decrease affecting value. This makes it possible to calculate a tool path that provides a high machining efficiency with suppressed occurrence of chatter vibration.

(10) The tool path generation device according to (9), in which the affecting value calculation section calculates the machining process gain as the chatter vibration increase and decrease affecting value in the case where at least a direction of the chatter vibration and a magnitude and a direction of a specific cutting resistance of the workpiece are specified or estimated.

Since the direction of chatter vibration and the magnitude and the direction of the specific cutting resistance of the workpiece are specified or estimated, the machining process gain can be calculated. Thus, it is possible to calculate a tool path that provides a high machining efficiency with suppressed occurrence of chatter vibration. In calculating the machining process gain, the vibration characteristics of the machine tool device may be specified or estimated in addition to the direction of chatter vibration and the magnitude and the direction of the specific cutting resistance.

(11) The tool path generation device according to (9) or (10), in which a machining system has high stability in the case where the magnitude of the machining process gain is small compared to a case where the magnitude of the machining process gain is large.

This enables machining conditions to be decided after the stability of chatter vibration is evaluated on the basis of the magnitude of the machining process gain. Thus, it is possible to calculate a tool path that provides a high machining efficiency with suppressed occurrence of chatter vibration.

(12) The tool path generation device according to (1), in which the affecting value calculation section calculates a magnitude of an open-loop transfer function of a machining system of the structure as the chatter vibration increase and decrease affecting value.

An increase in chatter vibration can be evaluated accurately using the magnitude of the open-loop transfer function of the machining system. Therefore, it is possible to calculate a tool path that provides a high machining efficiency with suppressed occurrence of chatter vibration.

(13) The tool path generation device according to (12), in which the affecting value calculation section calculates the magnitude of the open-loop transfer function as the chatter vibration increase and decrease affecting value in the case where all of vibration characteristics of the structure and a magnitude and a direction of a specific cutting resistance of the workpiece are specified or estimated.

The open-loop transfer function of the machining system can be calculated accurately. Therefore, it is possible to calculate a tool path that provides a high machining efficiency with suppressed occurrence of chatter vibration.

(14) The tool path generation device according to (12) or (13), in which the machining system is stable in the case where the magnitude of the open-loop transfer function is less than 1, the machining system is unstable in the case where the magnitude of the open-loop transfer function is more than 1, and the machining system has higher stability as the magnitude of the open-loop transfer function is smaller.

This enables machining conditions to be decided after the stability of chatter vibration is evaluated on the basis of the magnitude of the open-loop transfer function. Thus, it is possible to calculate a tool path that provides a high machining efficiency with suppressed occurrence of chatter vibration.

(15) The tool path generation device according to any one of (1) and (5) to (14), in which the machining condition decision section includes a stabilizing feed direction decision section that decides a chatter vibration stabilizing feed direction on the basis of the chatter vibration increase and decrease affecting value, the chatter vibration stabilizing feed direction being a feed direction of the tool with respect to the workpiece or of the workpiece with respect to the tool that does not increase the chatter vibration, and the machining condition decision section decides machining conditions on the basis of the chatter vibration stabilizing feed direction.

The chatter vibration increase and decrease affecting value is a value that affects increase and decrease in chatter vibration. Therefore, a feed direction that does not increase chatter vibration can be decided by evaluating the chatter vibration increase and decrease affecting value. The decided feed direction is determined as the chatter vibration stabilizing feed direction, and machining conditions are decided on the basis of the chatter vibration stabilizing feed direction. The machining conditions decided in this case can provide a high machining efficiency because the feed direction suppresses occurrence of chatter vibration. Thus, it is possible to calculate a tool path that provides a high machining efficiency with suppressed occurrence of chatter vibration.

(16) The tool path generation device according to (15), in which the stabilizing feed direction decision section decides the stabilizing feed direction by deciding the feed direction such that an angle formed between
at least one of
a plane including both
(a) a cutting direction of the tool, and
(b) a direction between a direction of extension of a cutting width and a direction of extension of a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool, and
a plane perpendicular to a direction of a resultant cutting force applied from the tool to the workpiece during machining, and
the direction of the chatter vibration is small.

For example, in the case where a feed direction is decided such that a plane including both (a) a cutting direction of the tool and (b) a direction of extension of a cutting width and a direction of extension of a regenerative width is parallel to the direction of chatter vibration, the cutting width and the regenerative width being included in a cross section of an uncut chip of the workpiece which is cut by the tool and which is perpendicular to a cutting direction, the cutting width being a width of a contour portion representing a surface generated as a result of current cutting, and the regenerative width being a width of a contour portion representing a surface generated as a result of previous cutting, variations in cross-sectional area of the uncut chip due to vibration are small even if vibration should be caused, and occurrence of a dynamic cutting force (amount of fluctuations in cutting force) caused by variations in cross-sectional area of the uncut chip is suppressed. Therefore, an increase in chatter vibration is suppressed. In the case where a feed direction is decided such that a plane perpendicular to a direction of a resultant cutting force applied from the tool to the workpiece during machining is parallel to the direction of chatter vibration, a component of the cutting force in the chatter vibration direction becomes zero. Therefore, an increase in chatter vibration is suppressed. Thus, a tool path that provides a high machining efficiency with suppressed occurrence of chatter vibration can be calculated by making the angle formed between the above plane and the direction of chatter vibration small so as to suppress an increase in chatter vibration.

(17) The tool path generation device according to (15) or (16), in which the machining condition decision section further includes a machining feed direction select section that selects a machining feed direction that is different from the chatter vibration stabilizing feed direction for a location at which machining cannot be performed using the chatter vibration stabilizing feed direction, and the machining condition decision section decides machining conditions on the basis of the chatter vibration stabilizing feed direction and the machining feed direction.

Machining may not be performed using the chatter vibration stabilizing feed direction at some locations of machining. Therefore, the machining condition decision section decides machining conditions on the basis of the chatter vibration stabilizing feed direction for locations at which machining can be performed using the chatter vibration stabilizing feed direction, and decides machining conditions on the basis of the machining feed direction for locations at which machining cannot be performed using the chatter vibration stabilizing feed direction. Thus, since machining conditions decided on the basis of the chatter vibration stabilizing feed direction provide a high machining efficiency, a tool path that provides a high machining efficiency with suppressed occurrence of chatter vibration can be calculated.

(18) The tool path generation device according to any one of (1) to (17), in which the machining condition decision section further includes a feed rate select section that selects an upper limit value of an allowable feed rate as a feed rate of the tool with respect to the workpiece or of the workpiece with respect to the tool, and the machining condition decision section decides machining conditions on the basis of the feed rate selected by the feed rate select section.

In the case where machining conditions are decided by selecting the upper limit value of the feed rate, machining conditions that provide a high machining efficiency can be obtained. In addition, it is known that an increase in feed rate does not significantly affect chatter vibration, but tends to suppress chatter vibration (to be exact, slightly suppress chatter vibration of the self-excited type, and conversely increase chatter vibration of the forced type, here, chatter vibration of the self-excited type which is often problematic is in focus). Thus, a tool path that provides a high machining efficiency with suppressed occurrence of chatter vibration can be calculated by deciding, as machining conditions, the upper limit value of the allowable feed rate as a feed rate, and deciding machining conditions on the basis of the upper limit value of the feed rate.

(19) A tool path generation method for calculating a tool path to be used by a machine tool device that machines a workpiece using at least one tool, characterized by including a step of calculating a chatter vibration increase and decrease affecting value that affects increase and decrease in chatter vibration caused in a structure formed by the tool, the workpiece, and the machine tool device, a step of deciding machining conditions on the basis of the calculated chatter vibration increase and decrease affecting value, and a step of calculating the tool path on the basis of the decided machining conditions.

According to the method, a tool path is calculated using machining conditions decided on the basis of the chatter vibration increase and decrease affecting value. Consequently, a reduction in machining efficiency due to the effect of chatter vibration is avoided. Therefore, the machining efficiency of machining can be improved, and a tool path that provides a high machining efficiency can be calculated.

(20) The tool path generation method according to (19), in which the step of calculating the chatter vibration affecting value includes calculating a magnitude of a cutting width or a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool.

(21) The tool path generation method according to (20), in which the step of calculating the chatter vibration affecting value includes calculating the magnitude of the cutting width or the regenerative width as the chatter vibration increase and decrease affecting value in the case where none of vibration characteristics of the structure, a direction of the chatter vibration, and a magnitude and a direction of a specific cutting resistance of the workpiece are specified or estimated.

(22) The tool path generation method according to (20) or (21), in which a machining system has high stability in the case where the magnitude of the cutting width or the regenerative width is small compared to a case where the magnitude of the cutting width or the regenerative width is large.

(23) The tool path generation method according to (19), in which the step of calculating the chatter vibration affecting value includes calculating, as the chatter vibration increase and decrease affecting value, a magnitude of a chatter vibration increase width that is based on at least one of
a first angle formed between
both
(a) a cutting direction of the tool, and
(b) a direction between a direction of extension of a cutting width and a direction of extension of a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool, that is, a plane including both the direction (a) and the direction (b), and
a direction of the chatter vibration, and
a second angle formed between a plane perpendicular to a direction of a resultant cutting force applied from the tool to the workpiece during machining, and the direction of the chatter vibration.

(24) The tool path generation method according to (23), in which the chatter vibration increase width is calculated on the basis of at least one the first angle and the second angle and a magnitude of the cutting width or the regenerative width.

(25) The tool path generation method according to (23) or (24), in which the step of calculating the chatter vibration affecting value includes calculating the magnitude of the chatter vibration increase width as the chatter vibration increase and decrease affecting value in the case where at least the direction of the chatter vibration or vibration characteristics of the structure are specified or estimated.

(26) The tool path generation method according to any one of (23) to (25), in which a machining system has high stability in the case where the magnitude of the chatter vibration increase width is small compared to a case where the magnitude of the chatter vibration increase width is large.

(27) The tool path generation method according to (20), in which the step of calculating the chatter vibration affecting value includes calculating a magnitude of a machining process gain of a machining system of the structure as the chatter vibration increase and decrease affecting value.

(28) The tool path generation method according to (27), in which the step of calculating the chatter vibration affecting value includes calculating the machining process gain as the chatter vibration increase and decrease affecting value in the case where at least a direction of the chatter vibration and a magnitude and a direction of a specific cutting resistance of the workpiece are specified or estimated.

(29) The tool path generation method according to (27) or (28), in which a machining system has high stability in the case where the magnitude of the machining process gain is small compared to a case where the magnitude of the machining process gain is large.

(30) The tool path generation method according to (19), in which the step of calculating the chatter vibration affecting value includes calculating a magnitude of an open-loop transfer function of a machining system of the structure as the chatter vibration increase and decrease affecting value.

(31) The tool path generation method according to (12), in which the step of calculating the chatter vibration affecting value includes calculating the magnitude of the open-loop transfer function as the chatter vibration increase and decrease affecting value in the case where all of vibration characteristics of the structure and a magnitude and a direction of a specific cutting resistance of the workpiece are specified or estimated.

(32) The tool path generation method according to (30) or (31), in which the machining system is stable in the case where the magnitude of the open-loop transfer function is less than 1, the machining system is unstable in the case where the magnitude of the open-loop transfer function is more than 1, and the machining system has higher stability as the magnitude of the open-loop transfer function is smaller.

(33) The tool path generation method according to any one of (19) and (23) to (32), in which the step of deciding the machining conditions includes a stabilizing feed direction decision section that decides a chatter vibration stabilizing feed direction on the basis of the chatter vibration increase and decrease affecting value, the chatter vibration stabilizing feed direction being a feed direction of the tool with respect to the workpiece or of the workpiece with respect to the tool that does not increase the chatter vibration, and machining conditions are decided on the basis of the chatter vibration stabilizing feed direction.

(34) The tool path generation method according to (33), in which the step of deciding the chatter vibration stabilizing feed direction includes deciding the stabilizing feed direction by deciding the feed direction such that an angle formed between at least one of
a plane including both
(a) a cutting direction of the tool, and
(b) a direction between a direction of extension of a cutting width and a direction of extension of a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool, and a plane perpendicular to a direction of a resultant cutting force applied from the tool to the workpiece during machining, and
the direction of the chatter vibration is small.

(35) The tool path generation method according to (33) or (34), in which the step of deciding the machining conditions further includes a machining feed direction select section that selects a machining feed direction that is different from the chatter vibration stabilizing feed direction for a location at which machining cannot be performed using the chatter vibration stabilizing feed direction, and machining conditions are decided on the basis of the chatter vibration stabilizing feed direction and the machining feed direction.

(36) The tool path generation method according to any one of (19) to (35), in which the step of deciding the machining conditions further includes a feed rate select section that selects an upper limit value of an allowable feed rate as a feed rate of the tool with respect to the workpiece or of the workpiece with respect to the tool, and the machining condition decision section decides machining conditions on the basis of the feed rate selected by the feed rate select section.

(37) A tool path generation program for calculating a tool path to be used by a machine tool device that machines a workpiece using at least one tool, characterized by including calculating a chatter vibration increase and decrease affecting value that affects increase and decrease in chatter vibration caused in a structure formed by the tool, the workpiece, and the machine tool device, deciding machining conditions on the basis of the calculated chatter vibration increase and decrease affecting value, and calculating the tool path on the basis of the decided machining conditions.

According to the program, a tool path is calculated using machining conditions decided on the basis of the chatter vibration increase and decrease affecting value. Consequently, a reduction in machining efficiency due to the effect of chatter vibration is avoided. Therefore, the machining efficiency of machining can be improved, and a tool path that provides a high machining efficiency can be calculated.

Embodiments of the present invention will be described in detail below. FIG. 1 is a schematic diagram showing the relationship between a tool path generation device 2 according to a first embodiment to which the present invention is applied and devices associated with the tool path generation device 2. In FIG. 1, the tool path generation device 2 receives as inputs 3D data on the shape of a part etc. designed by a CAD (Computer Aided Design) device 4 and data on the shape of a material to calculate a tool path (tool path), a feed speed, a rotational speed, etc. The rotational speed, the cutting depth, the feed rate, and the tool shape may be decided by a user through a dialogue, rather than being decided by the tool path generation device 2. Information such as the tool path calculated by the tool path generation device 2 is input to an NC (Numerical Control) program preparation device 6, which prepares an NC program on the basis of the input information. The NC program preparation device 6 prepares an NC program that can be used by individual machine tool devices as a control program on the basis of the information such as the tool path. The NC program preparation device 6 is also called a post processor, and may be included in the tool path generation device 2. A machine tool device 8 is a device that machines a workpiece using a tool on the basis of the NC program prepared by the NC program preparation device 6. The machine tool device 8 incorporates a machining tool, and is equipped with a table or a spindle for attachment of the workpiece. In addition, the tool path generation device 2 includes a CPU 10 that performs various processes, a display device 12 that displays various information, an input device 14 that allows the user to input machining conditions etc., a ROM 16 that stores various programs etc., a RAM 18 that temporarily stores various values etc., a storage device (HDD) 20 that stores the determined machining conditions, tool path, etc., and an input/output interface 22 that exchanges information with external devices. The components of the tool path generation device 2 are connected to each other through a bus line 24.

In the embodiment and each of embodiments to be discussed later, as an example of application of the present invention, machining conditions for performing ball end milling are decided. However, the present invention may also be applied to other machining methods. In each of the embodiments, description of the embodiment is occasionally made using a machining method other than ball end milling. However, such description can be also applied to machining methods other than the machining method on the basis of which the description is made.

Figure 2:
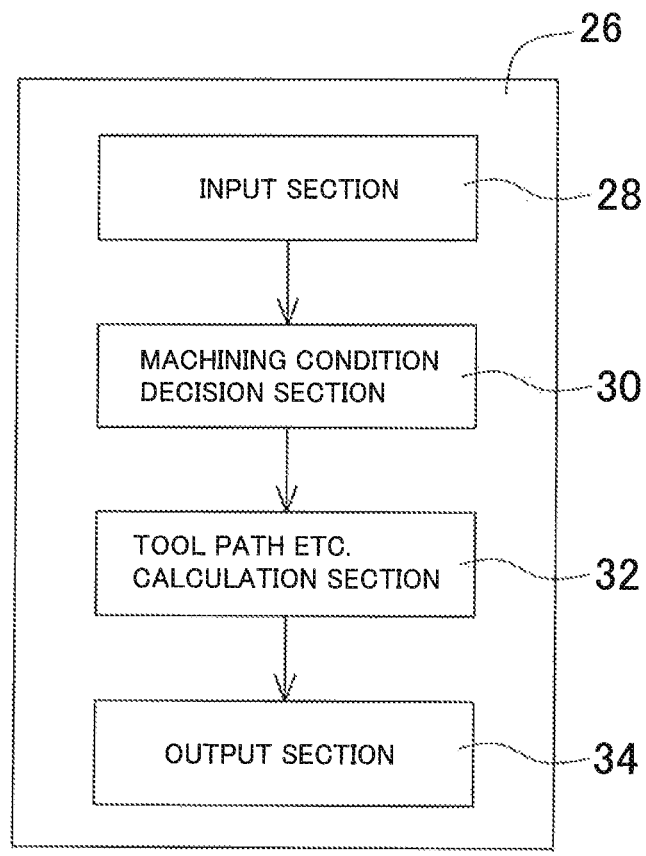
FIG. 2 is a schematic diagram showing the overall configuration of the tool path generation device 2 according to the first embodiment of the present invention.

Next, the tool path generation device 2 according to the first embodiment will be described in detail. FIG. 2 is a schematic diagram showing the configuration of a processing section 26 implemented by the CPU 10 of the tool path generation device 2. The processing section 26 includes an input section 28, a machining condition decision section 30, a tool path (tool path) etc. calculation section 32, and an output section 34. The input section 28 is used to input to the tool path generation device 2 the 3D data output from the CAD device 4, the machining conditions specified by an operator of the tool path generation device 2 (the cutting depth (a cutting depth in the direction perpendicular to the machined surface of the workpiece), the feed rate, the pick feed, the rotational speed, the shape of the tool, the number of blades of the tool, the radius of the tool, etc., and the vibration characteristics of the machine tool device 8 including the tool and the workpiece, and the specific cutting resistance of the workpiece (the specific cutting resistance of the workpiece against a certain tool)), the estimated vibration direction of chatter vibration, or information that the vibration characteristics are unknown, information that the specific cutting resistance of the workpiece is unknown, information that the direction of chatter vibration is unknown, etc. In the embodiment and each of the embodiments to be discussed later, the cutting depth d and the pick feed p may be input by the operator by designating a predetermined range or by designating the upper limit or the range of the product d*p (a value proportional to the machining efficiency) of the cutting depth d and the pick feed p, or may be automatically decided empirically or analytically on the basis of the required accuracy etc. without designating a range. In the case where the cutting depth d and the pick feed p are input by designating a predetermined range, the range of the cutting depth d is designated as d1 to d2, and the range of the pick feed is designated as p1 to p2. In the case of ball end milling, in particular, the range of the pick feed affects the quality of the finished surface. Therefore, such a range that ensures the quality of the machined surface and that does not significantly lower the machining efficiency is chosen. The vibration characteristics of the machine tool device 8 including the tool and the workpiece may be specified through an actual measurement or a simulation, or by selecting, among the existing vibration characteristics, vibration characteristics that are considered to be close to the vibration characteristics of the machine tool device 8 currently used. Similarly, the specific cutting resistance may be specified through an actual measurement or a simulation, or by selecting one among the existing specific cutting resistances.

The machining condition decision section 30 decides basic machining conditions in consideration of chatter vibration on the basis of the information (which partially includes the machining conditions) input using the input section. The basic machining conditions decided by the machining condition decision section 30 may be modified to machining conditions other than the decided machining conditions to perform machining at the entrance, the exit, corner portions, hole portions, etc. of the workpiece. The feed direction may also be modified to perform machining. The machining conditions decided by the machining condition decision section 30 are output to the tool path etc. calculation section 32, which calculates a tool path, the rotational speed of the tool, and in some cases the angle of the tool with respect to the workpiece, etc. The data calculated by the tool path etc. calculation section 32 are sent to the output section 34, and output from the tool path generation device 2 as data to be input to the NC program preparation device 6.

Figure 3:
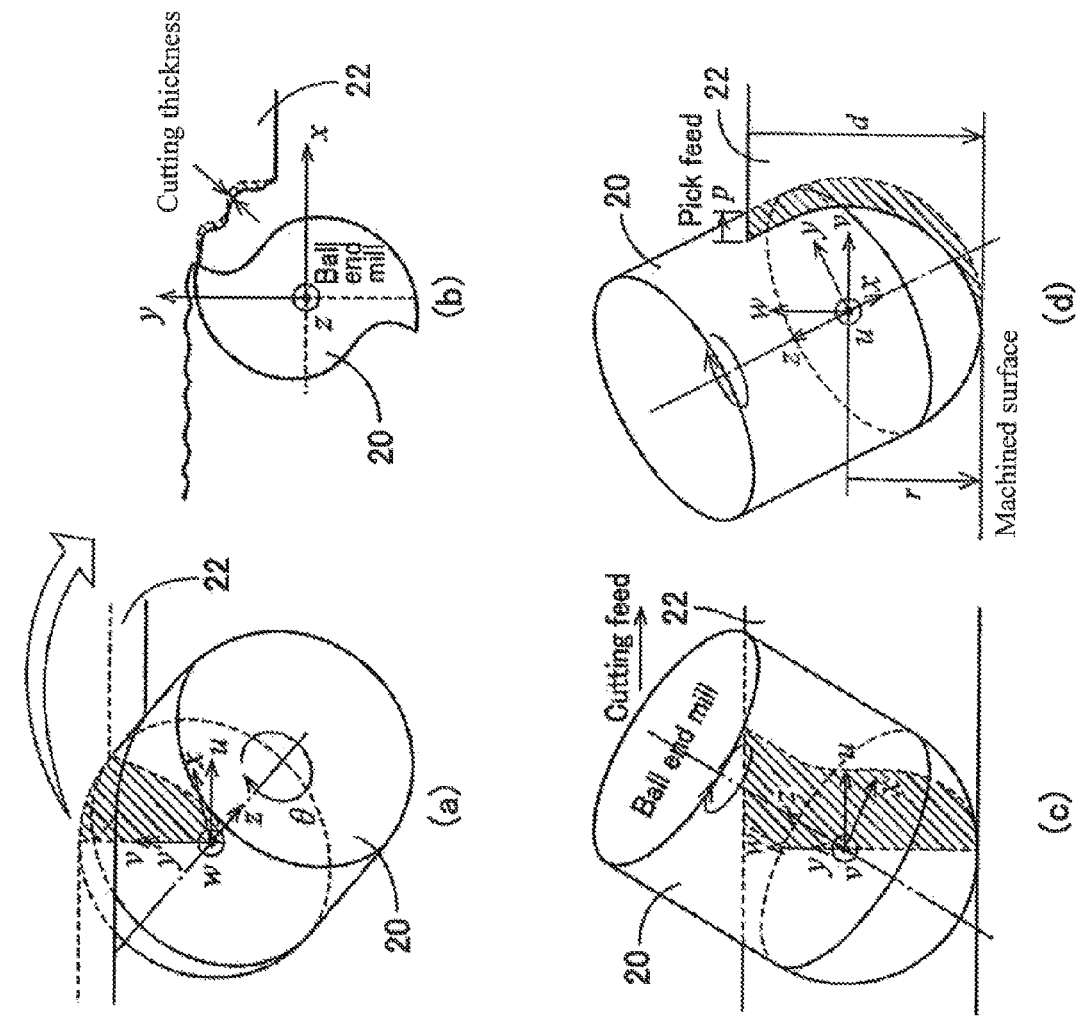
FIG. 3 is an enlarged schematic view showing a machining section of a machine tool device 8 according to the present invention, in which FIG. 3 (a) is a view seen from a direction (w direction) perpendicular to a machined surface of a workpiece 22, FIG. 3 (b) is a cross-sectional view in the x-y plane, FIG. 3 (c) is a view seen from the front, and FIG. 3 (d) is a view seen from a side.
Figure 4:
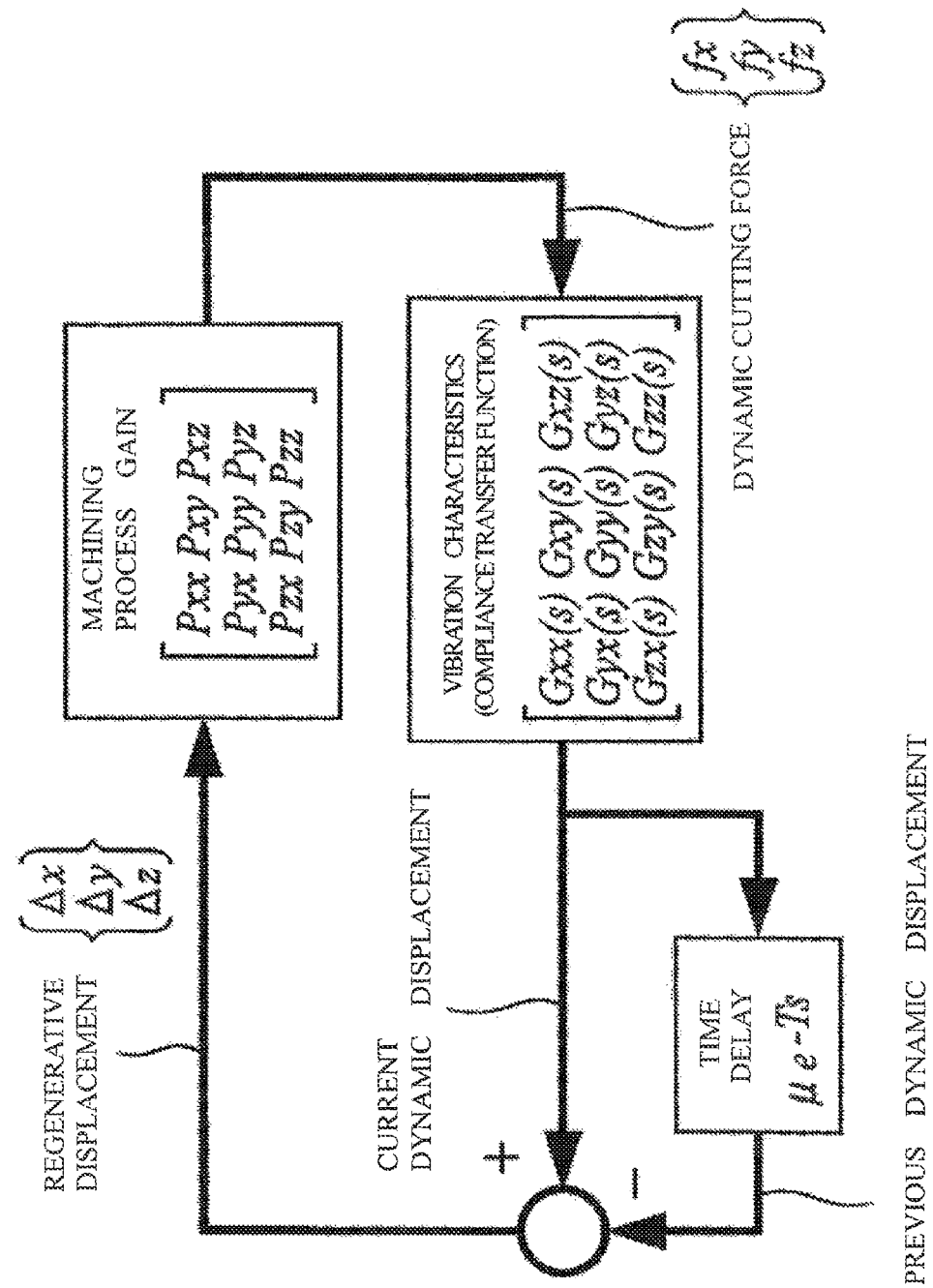
FIG. 4 is a block diagram showing a control system for the machine tool device 8 according to the present invention.

Next, a machining condition decision method used by the machining condition decision section 30 according to the embodiment will be described. Prior to that, a machining system of the machine tool device 8 which performs machining on the basis of the output from the tool path generation device 2 will be described with reference to FIGS. 3 and 4. FIG. 3 is an enlarged schematic view showing a machining section (showing a ball end mill by way of example) of the machine tool device 8, in which FIG. 3(*a*) is a view seen from the direction (w direction) perpendicular to the machined surface of a workpiece 22, FIG. 3(*b*) is a cross-sectional view in the x-y plane seen from the axial direction (z direction) of a ball end mill 20, FIG. 3(*c*) is a view seen from the pick feed direction (v direction) in the plane parallel to the machined surface of the workpiece 22, and FIG. 3(*d*) is a view seen from the cutting feed direction (u direction) in the plane parallel to the machined surface of the workpiece 22. FIG. 4 is a block diagram showing a machining system with vibration.

In FIG. 3, the axial direction of the ball end mill 20 is defined as the z direction, and directions orthogonal to the z direction and orthogonal to each other are defined as the x direction and the y direction. In addition, the feed direction (cutting feed direction) of the ball end mill 20 with respect to the workpiece 22 is defined as the u direction, the pick feed direction of the ball end mill 20 with respect to the workpiece 22 is defined as the v direction, and the direction perpendicular to the machined surface of the workpiece 22 is defined as the w direction. In FIG. 3, a path indicated by the solid line corresponds to vibration one cutting edge period earlier, and a path indicated by the dotted line corresponds to current vibration.

The machining system for the ball end mill 20 defined in FIG. 3 for a case where chatter vibration is caused between the ball end mill 20 and the workpiece 22 and the ball end mill 20 is displaced in the x direction, the y direction, and the z direction by the chatter vibration is as shown in FIG. 4. In the embodiment, the ball end mill 20 is displaced by chatter vibration. However, displacement due to chatter vibration is relative between the ball end mill 20 and the workpiece 22, and therefore the same can be applied to a case where the workpiece 22 is displaced.

In FIG. 4, regenerative displacement (which is the difference between current vibration displacement and vibration displacement one blade period earlier, and which causes fluctuations in cutting thickness) ($\Delta x$, $\Delta y$, $\Delta z$) is multiplied by a machining process gain to derive a dynamic cutting force, that is, amount of fluctuations in cutting force (fx, fy, fz). Multiplying the dynamic cutting force (fx, fy, fz) by vibration characteristics (compliance transfer function) derives current vibration displacement, from which a value of the same product with a time delay (a delay of one blade period), that is, vibration displacement one blade period earlier, is subtracted to derive regenerative displacement ($\Delta x1$, $\Delta y1$, $\Delta z1$) again as the difference therebetween (see FIG. 3(*b*)). A comparison is performed between ($\Delta x1$, $\Delta y1$, $\Delta z1$) and ($\Delta x$, $\Delta y$, $\Delta z$). In the case where ($\Delta x1$, $\Delta y1$, $\Delta z1$) and ($\Delta x$, $\Delta y$, $\Delta z$) are equal to each other, it means that the vibration is neither amplified nor attenuated through the closed loop. In this case, the vibration is at the chatter vibration stability limit. This state is expressed by a gain margin $g_m$ of 0 dB because the open-loop transfer function is 1. In the case where ($\Delta x1$, $\Delta y1$, $\Delta z1$) is $1/g_m$ times ($\Delta x$, $\Delta y$, $\Delta z$) (that is, ($\Delta x1$, $\Delta y1$, $\Delta z1$)=$(1/g_m)\times(\Delta x, \Delta y, \Delta z)$) and $g_m>1$, on the other hand, no chatter vibration is caused because the open-loop transfer function is less than 1. Even if vibration should be caused for some reason, such vibration is attenuated through the closed loop. This state is expressed by a gain margin of more than 0 dB. In the case of $g_m<1$, meanwhile, vibration is increased because the open-loop transfer function is more than 1. This state is expressed by a gain margin of less than 0 dB. In order to calculate the value of the gain margin of the machining system, the specific cutting resistance of the workpiece 22 and the vibration characteristics (a matrix G in FIG. 4) of the machine tool device 8 including the tool and the workpiece are needed. However, the specific cutting resistance and the vibration characteristics may be input using the input section of the tool path generation device 2. In the embodiments to be discussed later, in the case where the specific cutting resistance and the vibration characteristics are unknown (cannot be specified or estimated), machining conditions under which it is highly likely that chatter vibration is not increased are calculated without calculating the value of the gain margin of the machining system.

Figure 5:
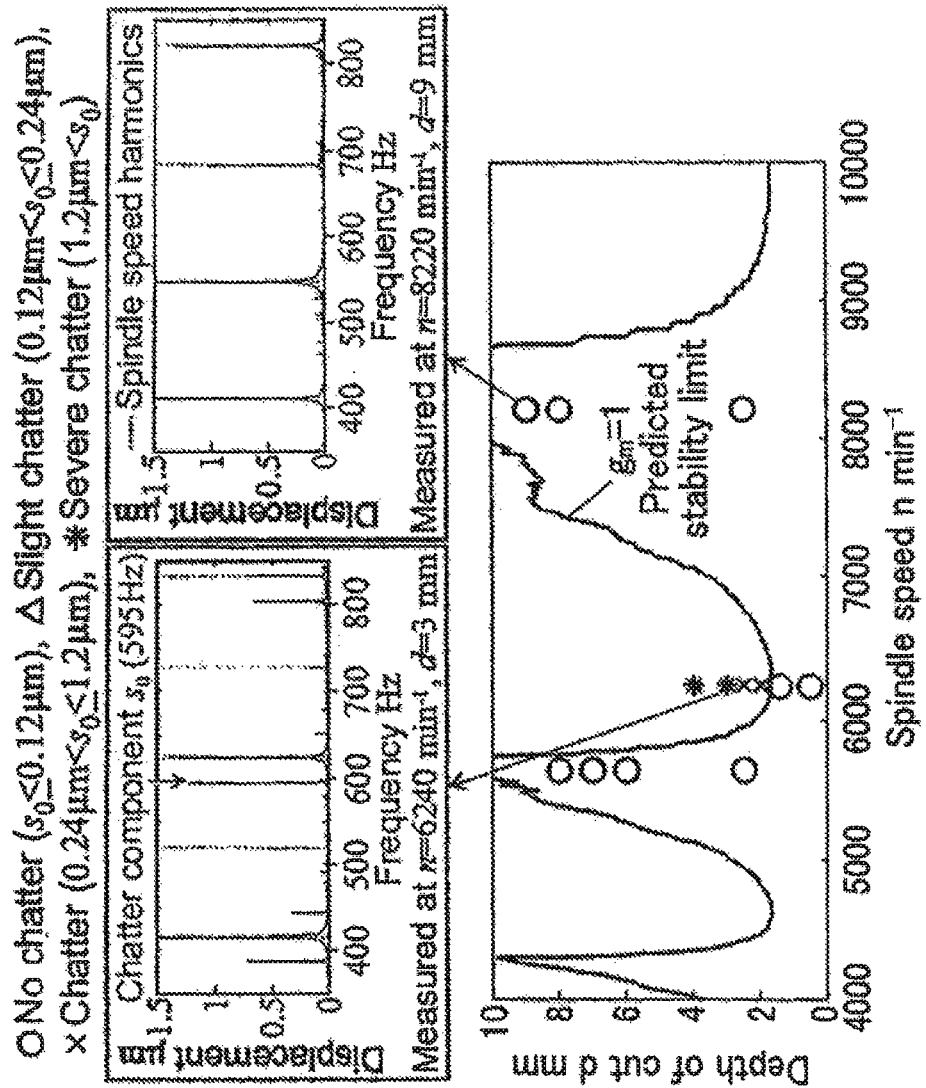
FIG. 5 is a graph showing the relationship between the cutting depth and the chatter vibration stability limit with respect to the rotational speed of a ball end mill 20 according to the present invention.

The chatter vibration stability limit will be described with reference to FIG. 5. The lower part of FIG. 5 is a graph showing the rotational speed n (revolutions per minute) of the ball end mill 20 represented by the horizontal axis, the cutting depth d (mm) represented by the vertical axis, and the chatter vibration stability limit (Predicted stability limit in FIG. 5), which is obtained through analysis using the vibration characteristics of the machine tool device 8 including the tool and the workpiece and the specific cutting resistance of the workpiece 22. The cutting depth d indicates a cutting depth in the direction perpendicular to the machined surface of the workpiece 22. In FIG. 5, the graph indicated by the solid line indicates the relationship between the chatter vibration stability limit, that is, the rotational speed n at which the gain margin of the machining system is 0 dB, and the cutting depth d. In the case where the cutting depth d is smaller than the cutting depth indicated by the solid line at which the gain margin of the machining system is 0 dB (in the case of ○ marks in FIG. 5, for example), the gain margin of the machining system is more than 0 dB, and no chatter vibration is caused. For example, in the case where the rotational speed n is 8220 $\min^{-1}$ and the cutting depth d is 9 mm as shown in the graph on the upper right of FIG. 5, the chatter vibration stability limit is not reached, and no vibration is caused. Meanwhile, in the case where the cutting depth d is larger than the cutting depth indicated by the solid line at which the gain margin of the machining system is 0 dB (in the case of × and * marks in FIG. 5, for example), the gain margin of the machining system is less than 0 dB, which indicates that chatter vibration is caused. For example, in the case where the rotational speed n is 6240 $\min^{-1}$ and the cutting depth d is 3 mm as shown in the graph on the upper left of FIG. 5, the chatter vibration stability limit is exceeded, and chatter vibration at 595 Hz is caused.

(First Embodiment: Machining Conditions are Decided on the Basis of Cutting Width or Regenerative Width)

Figure 6:
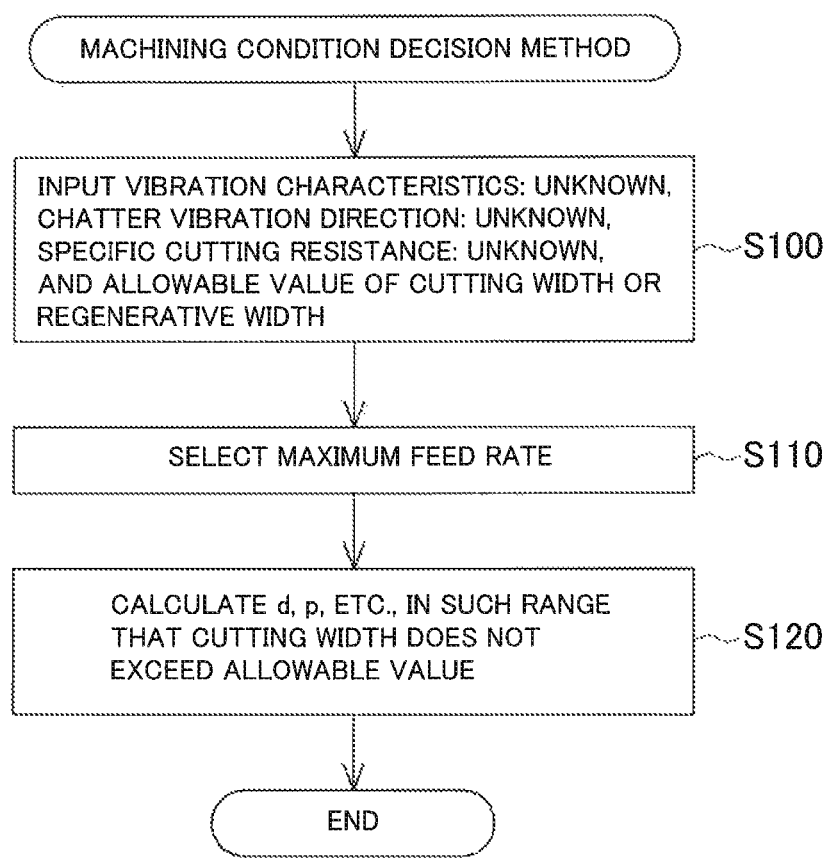
FIG. 6 is a flowchart illustrating a machining condition decision method according to the first embodiment of the present invention.

Next, a machining condition decision method used by the machining condition decision section 30 of the tool path generation device 2 according to the first embodiment of the present invention will be described with reference to FIG. 6. FIG. 6 is a flowchart illustrating a machining condition decision method according to the first embodiment. In the first embodiment, by way of example, the vibration characteristics of the machine tool device 8 including the tool and the workpiece are unknown, and the vibration direction of chatter vibration caused in the machine tool device 8 is also unknown. Further, it is assumed that the magnitude and the direction of the specific cutting resistance of the workpiece against the tool are also unknown.

In FIG. 6, in step 100 (hereinafter simply referred to as S100, the same applies to the steps described below), the operator inputs through the input section 28 information that the vibration characteristics of the machine tool device 8 including the tool and the workpiece are unknown, information that the direction of chatter vibration caused in the machine tool device 8 is unknown, information that the magnitude and the direction of the specific cutting resistance of the workpiece against the tool are unknown, and the allowable value of the cutting width or the regenerative width to be discussed later. The range of the feed rate (the feed rate per rotation for turning, the feed rate per rotation or cutting edge for end milling, and the feed rate per path for planing and shaping) (or the upper limit of the feed rate) may be input through the input section 28, or may be stored in advance in the tool path generation device 2. Next, in S110, the allowable maximum feed rate is selected as the feed rate. The term "allowable maximum feed rate" refers to the maximum feed rate selected in consideration of the finished surface roughness of the workpiece and the strength of the tool. Here, the reason for selecting the maximum feed rate as machining conditions in S110 will be described below.

Figure 7:
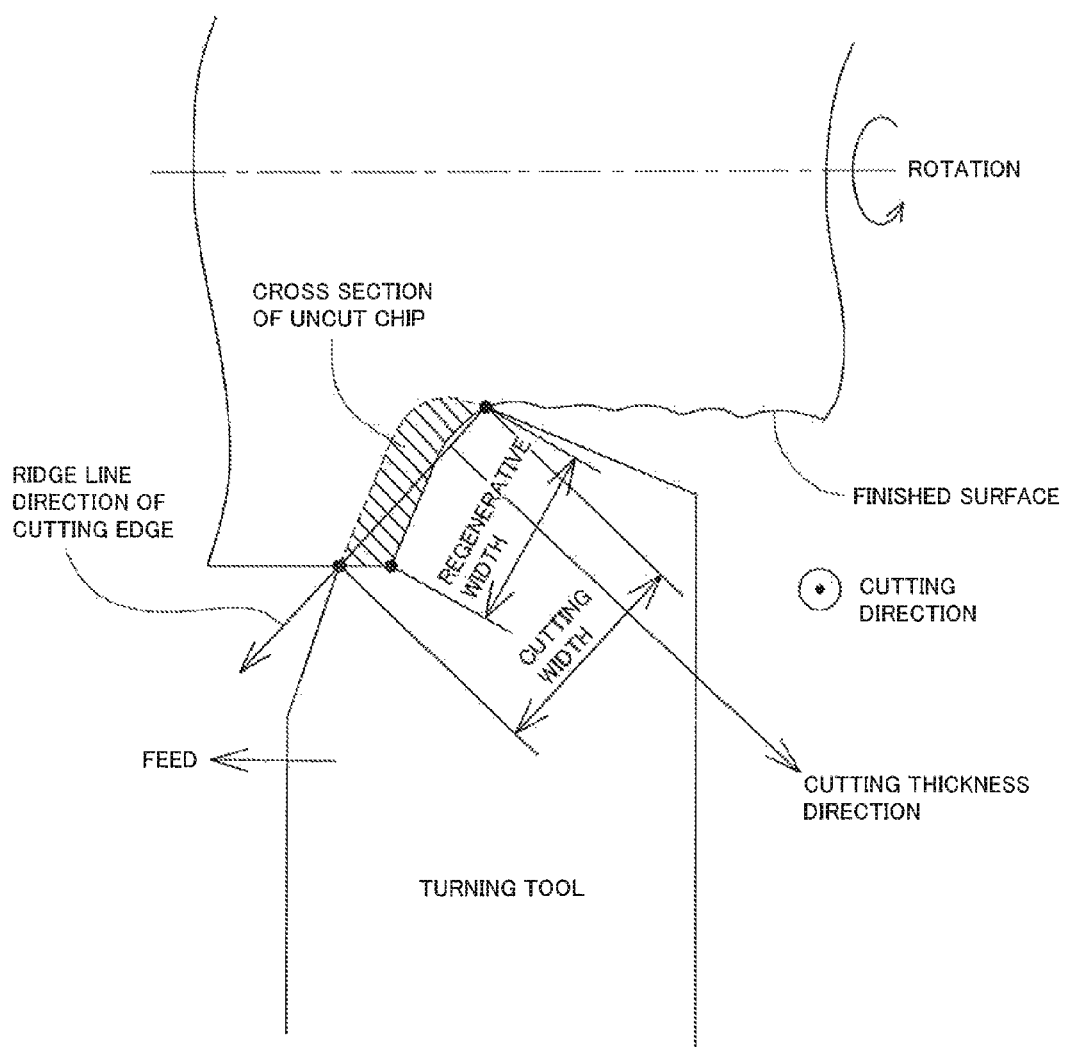
FIG. 7 is a schematic view illustrating how cutting is performed using a round tool bit as a turning tool.

In the tool path generation device 2 according to the first embodiment, in deciding machining conditions, the vibration characteristics of the machine tool device 8 including the tool and the workpiece, the direction of chatter vibration caused in the machine tool device 8, and the magnitude and the direction of the specific cutting resistance of the workpiece against the tool are unknown. In the case where the direction of chatter vibration is not known, the stability of chatter vibration is evaluated by assuming that the direction of chatter vibration is such a direction that vibration is increased to the greatest degree in the case where vibration should be caused. Here, the direction that the chatter vibration is increased to the greatest degree is determined as the cutting thickness direction (see FIG. 7). FIG. 7 is a schematic view illustrating how cutting is performed using a round tool bit as a turning tool. A portion of the cross section of the uncut chip indicated by the broken line indicates a surface newly generated as a result of cutting performed by the current cutting edge, and a portion of the cross section of the uncut chip indicated by the solid line indicates a surface mainly generated by the previous cutting edge.

As shown in FIG. 7, the term "cutting thickness direction" refers to the direction of vibration that varies the cross-sectional area of the uncut chip (area of the workpiece removed by the tool seen in the cutting direction) to the greatest degree, and to the direction perpendicular to both the ridge line direction of the cutting edge of the tool and the cutting direction. For example, in the case of a curved cutting edge such as a round tool bit for turning, the ridge line direction of the cutting edge can be approximated by a direction connecting both ends of a portion involved in cutting (approximated by the average direction). In the case where a portion involved in cutting is varied in short periods as in ball end milling, further, the cutting thickness direction can be approximated by a direction obtained by temporally averaging the cutting thickness direction at each moment. In the case where the cutting thickness direction is set in this way, the cross-sectional area of the uncut chip, which increases and decreases because of the current vibration is approximately proportional to the width of a portion of the cross section of the uncut chip involved by the current cutting edge (portion indicated by the broken line in FIG. 7) seen in the vibration direction and to vibration displacement. Here, the width of a portion of the cross section of the uncut chip involved by the current cutting edge is referred to as a cutting width. The cutting width is the width of a portion of the cross section of the uncut chip involved by the current cutting edge seen in a plane perpendicular to the cutting direction, and not the width on the rake face of the tool (round tool bit). The magnitude of the cutting width is a value that affects the cross-sectional area of the uncut chip. Therefore, the magnitude of the cutting width can be considered as an example of a value that affects increase and decrease in chatter vibration. Thus, in S120 to be discussed later, machining conditions are decided in consideration of the magnitude of the cutting width.

In addition, the cross-sectional area of the uncut chip which increases and decreases because of vibration of the previous cutting edge (one rotation earlier for a tool having a single blade, one blade earlier for a tool having a multiplicity of blades, and one path earlier for shaping and planing) is approximately proportional to the width of a portion of the cross section of the uncut chip involved by the previous cutting edge seen in the vibration direction and to vibration displacement. Here, the width of a portion of the cross section of the uncut chip involved by the previous cutting edge is referred to as a regenerative width. In general, the regenerative width is slightly smaller than the cutting width, and the ratio in magnitude between the regenerative width and the cutting width seen in the vibration direction is often represented by an overlapping rate $\mu$ (regenerative width seen in the vibration direction=overlapping rate*cutting width seen in the vibration direction). As discussed above, the regenerative width significantly affects increase and decrease in the cross-sectional area of the uncut chip due to the regenerative effect, and therefore it is considered that chatter vibration is more likely to occur as the regenerative width is larger. That is, as the feed rate in turning (rate per rotation), the feed rate in end milling (rate per cutting edge), or the feed rate in shaping or planing (rate per path) is smaller, the finished surface roughness is smaller, but instead the regenerative width is larger, which makes chatter vibration more likely to occur. Thus, in order to suppress occurrence of chatter vibration, it is necessary to select such a feed rate that reduces the regenerative width. For this purpose, in the first embodiment, the allowable maximum feed rate is selected as machining conditions in S110. Under conditions where the feed rate is small, a layer hardened because of the previous cutting is cut at a higher proportion, and the roundness of the blade tip is relatively increased, which yields a dimensional effect of increasing the specific cutting resistance. This is known to increase the dynamic cutting force, and to make chatter vibration more likely to occur. The allowable maximum feed rate is selected to avoid such adverse effects. In the case where the value or the range of the feed rate is input by the operator, or designated by a system that optimizes the load resistance of the tool or the machine tool device 8, the finished surface roughness, etc., the designated maximum value of the feed rate is selected.

Next, in S120, a combination of the cutting depth d, the pick feed p, and the tool attitude at which the machining efficiency becomes maximum is calculated for each location of machining. Here, in the case where the operator designates the range d1 to d2 and the range p1 to p2 using the input section 28, the cutting depth d, the pick feed p, and the tool attitude at which the machining efficiency becomes maximum for a case where the feed rate selected in S110 is used are calculated in such ranges in S120 in consideration of the stability of chatter vibration. In calculating the cutting depth d, the pick feed p, and the tool attitude, the maximum load (cutting force) for a case where the feed rate selected in S110 is used may be obtained through analysis, and the cutting depth d, the pick feed p, and the tool attitude may be calculated such that the maximum allowable values at which the tool is not chipped are not exceeded. In addition, the cutting width calculated on the basis of the cutting depth d and the pick feed p is set so as not to exceed the allowable value of the cutting width input in S100. That is, as discussed above, the magnitude of the cutting width is a value that affects increase and decrease in chatter vibration. Therefore, the magnitude of the cutting width is calculated on the basis of the cutting depth d and the pick feed p, and the cutting depth d, the pick feed p, etc. are decided such that the calculated cutting width does not exceed the allowable value of the cutting width input in S100. A tool path etc. is calculated by the tool path etc. calculation section 32 on the basis of the feed rate, the cutting depth d, the pick feed p, the tool attitude, etc. decided in this way, and output to the outside via the output section 34.

Thus, the tool path generation device 2 according to the first embodiment of the present invention selects the allowable maximum feed rate as machining conditions, decides the cutting depth d and the pick feed p in consideration of the magnitude of the cutting width, and calculates a tool path etc. on the basis of such values. Therefore, it is possible to calculate a tool path that provides a high machining efficiency with suppressed occurrence of chatter vibration. In the embodiment, in addition, it is not necessary to specify the vibration characteristics of the machine tool device 8 including the tool and the workpiece, the direction of chatter vibration, and the magnitude and the direction of the specific cutting resistance. Therefore, the trouble of specifying the vibration characteristics etc. can be effectively reduced. In the first embodiment, a machining condition decision method for a case where none of the vibration characteristics of the machine tool device 8 including the tool and the workpiece, the direction of chatter vibration, the magnitude and the direction of the specific cutting resistance is specified is described. However, the same machining condition decision method as that of the first embodiment may also be adopted in the case where the vibration characteristics of the machine tool device 8 including the tool and the workpiece and the direction of chatter vibration are unknown but the magnitude and the direction of the specific cutting resistance are specified. This is because it is difficult to decide machining conditions for suppressing an increase in chatter vibration in the case where the direction of chatter vibration cannot be specified even if the direction of the specific cutting resistance is specified. The machining condition decision method according to the first embodiment may also be adopted in the case where at least one of the vibration characteristics, the direction of chatter vibration, and the magnitude and the direction of the specific cutting resistance is specified as in embodiments to be discussed later. In the tool path generation device 2 according to the embodiment, a section that selects a maximum feed rate in S110 constitutes the feed rate select section, a section that calculates a cutting width in S120 constitutes the affecting value calculation section, and the cutting width constitutes the chatter vibration increase and decrease affecting value.

In the first embodiment, the operator inputs the allowable value of the cutting width in S100. In specifying the allowable value of the cutting width, the operator may specify the allowable value in consideration of the fact that chatter vibration is more likely to occur as the cutting width is larger. The allowable value of the cutting width may also be specified by the following method. In the case where the operator specifies a hardness of the workpiece (which can be approximated to be about the same as the compressive strength and about twice the shear strength) of 1000 MPa and a maximum value of the compliance transfer function of 1 $\mu$m/N, the specific cutting resistance Kt in the cutting thickness direction in which chatter vibration tends to be increased can be estimated to be 1000 MPa with the shear strength defined as 500 MPa, the friction coefficient defined as $1/\sqrt{3}$ (which is about 0.577, and which can be approximated as the most common value), and the rake angle defined as 0 degrees and by utilizing a shear model and the least energy principle. Next, in the case where the cutting width is defined as Bm, the value of the machining process gain is 1000*B (MN/m), and the value of the open-loop transfer function (an index value for approximation) with the term for the time delay ignored is 1000*B*1=1000*B. Consequently, when the cutting width is 0.001 m, the magnitude of the open-loop transfer function is 1, and the gain margin is 0 dB. Thus, the allowable value of the cutting width is a value equal to or less than 0.001 m. By using the thus calculated allowable value of the cutting width, it is possible to decide machining conditions for suppressing an increase in chatter vibration. In the case where the largest negative real part (a negative value with the largest absolute value) Grm of the compliance transfer function is specified, an unconditional safety limit cutting width B may be calculated through substitution into a well-known formula B=−1/(2*Kt*Grm). For example, in the case of Kt=1000 MPa and Grm=−0.5 μm/N, B=−1/(−2*1000*0.5)=0.001 m.

In the first embodiment discussed above, a tool path that provides the maximum machining efficiency is calculated in such a range that the magnitude of the cutting width does not exceed the allowable value. Therefore, at a portion at which the stability of the machining system against chatter vibration is lowered because the cutting width tends to be large such as a corner portion of the workpiece, a tool path is calculated by generating a plurality of paths appropriate to keep the cutting width equal to or less than the allowable value. The regenerative width may be used in place of the cutting width, and a tool path may be calculated by deciding machining conditions such that the machining efficiency is improved in such a range that the regenerative width does not exceed the allowable value. This is because chatter vibration which is problematic in practical use is often of the regenerative type which is due to the regenerative effect, and even if vibration should be caused in the previous cutting, variations (regenerative effect) in current cross-sectional area of the uncut chip are small and a small dynamic cutting force (amount of fluctuations in cutting force) which increases chatter vibration is caused in the case where the regenerative width is small.

(Second Embodiment: Machining Conditions are Decided on the Basis of Chatter Vibration Increase Width)

Figure 8:
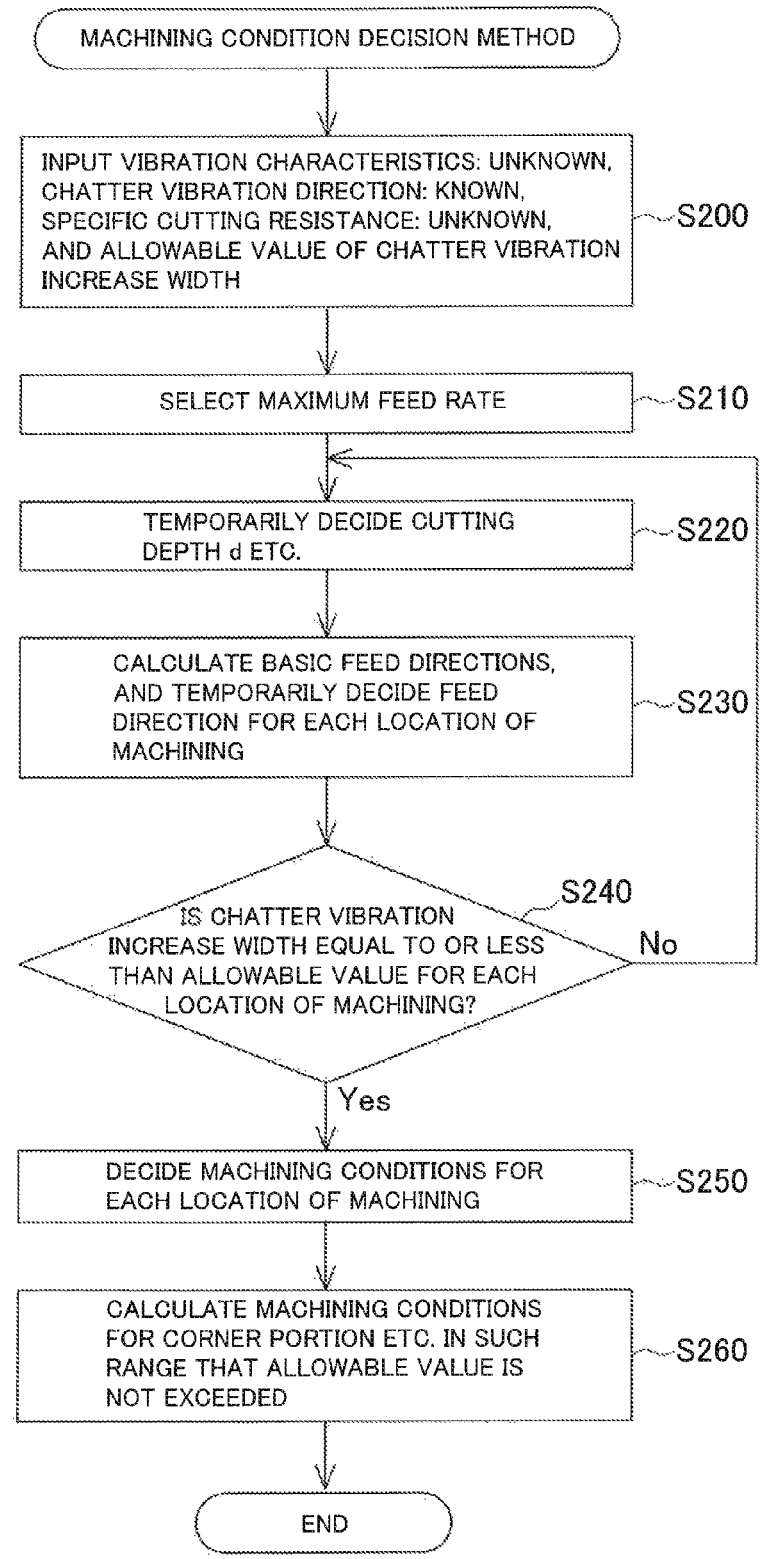
FIG. 8 is a flowchart illustrating a machining condition decision method according to a second embodiment of the present invention.

Next, a machining condition decision method used by the machining condition decision section 30 of the tool path generation device 2 according to a second embodiment of the present invention will be described with reference to FIG. 8. FIG. 8 is a flowchart illustrating a machining condition decision method according to the second embodiment. In the second embodiment, a chatter vibration increase width to be discussed later is set as a parameter, and a feed direction is selected such that the direction of chatter vibration is a direction that can suppress an increase in chatter vibration to enable high-efficiency machining with a large cutting width or regenerative width. In the second embodiment, by way of example, it is assumed that the vibration characteristics of the machine tool device 8 including the tool and the workpiece and the magnitude and the direction of the specific cutting resistance are unknown, but that the vibration direction of chatter vibration is known.

In FIG. 8, in S200, the operator inputs information that the vibration characteristics of the machine tool device 8 including the tool and the workpiece are unknown, information that the direction of chatter vibration caused in the machine tool device 8 is specified or estimated (and information on the vibration direction), and information that the magnitude and the direction of the specific cutting resistance of the workpiece against the tool are unknown. In addition, the allowable value of the chatter vibration increase width to be used in S240 is also input in S200. Next, in S210, the maximum feed rate is selected from a designated range of feed rate. Here, the value or the range of the feed rate is input by the operator, or designated by a system that optimizes the load resistance of the tool or the machine tool device 8, the finished surface roughness, etc. Next, in S220, the cutting depth d, the pick feed p, and in the case of end milling performed using a multiaxis machine tool, the tool attitude are temporarily decided in consideration of an empirically known value, a value input by the operator, etc. The cutting depth d etc. is temporarily decided because such values are needed to decide a feed direction in S230 to be discussed later. Next, in S230, a feed direction of the tool with respect to the workpiece is temporarily decided. Here, the method of deciding a feed direction in S230 will be described.

In the tool path generation device 2 according to the second embodiment, in deciding machining conditions, the direction of chatter vibration is known. Thus, in the second embodiment, an increase in chatter vibration is suppressed by specifying the feed direction such that the direction of chatter vibration is included in a particular plane, or such that the angle formed between the direction of chatter vibration and a particular plane is small. Here, the particular plane discussed earlier is one of the following two planes. The first particular plane is a plane including both the direction of the cutting width and the cutting direction. This is because even if vibration should be caused in a direction parallel to the plane including both the direction of the cutting width and the cutting direction, variations in cross-sectional area of the uncut chip are small and a small dynamic cutting force (amount of fluctuations in cutting force) which increases chatter vibration is caused (see FIG. 9 to be discussed later). The direction of the cutting width is the direction of extension of the cutting width discussed earlier, and the direction connecting both ends of a portion of the cross section of the uncut chip (plane perpendicular to the cutting direction) involved by the current cutting edge. In the case where the direction of the cutting width and the cutting direction are fluctuated in short periods as in ball end milling, the above plane can be specified through approximation in which the average values of the direction of the cutting width and the cutting direction are used. The second particular plane is a plane perpendicular to the direction of a resultant cutting force. The term "resultant cutting force" refers to a resultant of component forces in various directions that the tool applies to the workpiece during machining (often called a main component force in the cutting direction, a radial component force in the cutting depth direction, and a feed component force in the feed direction). This is because when the direction of chatter vibration is a direction parallel to the plane perpendicular to the direction of the resultant cutting force, a force component of the resultant cutting force in the chatter vibration direction becomes zero, which does not increase chatter vibration (see FIG. 11 to be discussed later). Similarly, in the case where the direction of the resultant cutting force is fluctuated, the above plane can be specified through approximation in which the average value of a resultant cutting force vector is used. The direction of the regenerative width may be used in place of the direction of the cutting width, and the first one of the above particular planes may be defined as a plane including both the direction of the regenerative width and the cutting direction, or as a plane including both a direction between the direction of the cutting width and the direction of the regenerative width and the cutting direction. This is because chatter vibration which is problematic in practical use is often of the regenerative type which is due to the regenerative effect, and even if vibration is caused in a direction parallel to the plane including the direction of the regenerative width and the cutting direction in the previous cutting, variations (regenerative effect) in current cross-sectional area of the uncut chip due to vibration in the previous cutting are small and a small dynamic cutting force (amount of fluctuations in cutting force) which increases chatter vibration is caused. In general, the direction of the cutting width and the direction of the regenerative width are close to each other. Thus, in the case where a plane including a direction between the cutting width and the regenerative width and the cutting direction is defined as the particular plane, a small angle is formed between a plane including the direction of the cutting width and the cutting direction and the direction of chatter vibration. Therefore, even if vibration should be caused in the direction of chatter vibration in the current cutting, variations in cross-sectional area of the uncut chip are small. Further, a small angle is formed between a plane including the direction of the regenerative width and the cutting direction and the direction of chatter vibration. Therefore, even if vibration should be caused in the direction of chatter vibration in the previous cutting, variations in current cross-sectional area of the uncut chip are small, which makes an increase in chatter vibration of the regenerative type difficult.

In the case where the particular plane is defined as discussed above, the angle formed between the plane including the direction of the cutting width (regenerative width) and the cutting direction and the direction of chatter vibration is defined as $\theta_1$, the angle formed between the plane not perpendicular to the direction of the resultant cutting force and the direction of chatter vibration is defined as $\theta_2$, and the cutting width (regenerative width) is defined as B to set a parameter $B*\sin \theta_1 *\sin \theta_2$. The parameter has a value that affects increase and decrease in chatter vibration, and represents the degree of increase in chatter vibration. Therefore, the parameter is called a chatter vibration increase width. As the magnitude of the chatter vibration increase width is smaller, the machining process gain is smaller, and the chatter vibration stability (gain margin of the machining system) is higher. Thus, by deciding the feed direction such that the direction of chatter vibration is included in the particular plane, the chatter vibration increase width is brought to zero, and an increase in chatter vibration is suppressed. By deciding the feed direction such that the direction of chatter vibration is positioned between the two particular planes, in addition, the chatter vibration increase width is made small, and an increase in chatter vibration is suppressed. The cutting width B is decided on the basis of the cutting depth d temporarily decided in S220. Thus, in S230, a basic feed direction (chatter vibration stabilizing feed direction) that reduces the chatter vibration increase width is calculated. The basic feed direction is determined as such a direction that reduces the chatter vibration increase width as discussed above. Therefore, the feed direction is not limited to one direction, and a plurality of directions is calculated as the basic feed direction. Then, for each location of machining, in the case where any of the basic feed directions is appropriate, the appropriate direction is temporarily decided as the feed direction. In the case where none of the feed directions is appropriate, or in the case where the feed direction is varied as in arcuate feed (in the case where a tool path for finish machining is to be calculated, in particular, the finished surface properties are given priority, and thus the feed direction is often selected from paths along the machined surface), a direction close to the basic feed direction (with a small chatter vibration increase width) is temporarily decided as the feed direction (which may be a feed direction varied as an arc or a spline). Here, in the case where a plurality of basic feed directions are obtained, an appropriate feed direction can be selected using as an evaluation criterion the fact that the angle formed with the surface of the final shape of the product (the largest value or the average value in the case where a plurality of angles are formed) is small, or the fact that the overall machining time or path distance including a return operation during machining is short. In general, locations of machining have different plane orientations. For locations of machining having the same plane orientation, the same feed direction may be adopted. In the second embodiment, it is assumed that the resultant cutting force is unknown (the resultant cutting force can be calculated on the basis of the magnitude and the direction of the specific cutting resistance). Therefore, for a feed direction decided in S250 to be discussed later, it can be considered that the angle formed between the plane including both the direction of the cutting width and the cutting direction and the direction of chatter vibration is small, and the chatter vibration increase width is represented by $B*\sin \theta_1$.

Next, in S240, a chatter vibration increase width is calculated for each location of machining using the feed rate selected in S210, the cutting depth d etc. temporarily decided in S220, and the feed direction temporarily decided in S230, and it is determined whether or not the calculated chatter vibration increase width is equal to or less than the allowable value of the chatter vibration increase width input in S200. For a location of machining for which it is not determined in S240 that the calculated chatter vibration increase width is equal to or less than the allowable value (S240: No), the process proceeds to S220. In S220, a new cutting depth d etc. is temporarily decided (for example, a search is performed in the order of larger to smaller cutting depths in a possible range in order to enhance the machining efficiency. The steps between the cutting depths may be an integer part of the depth that needs to be removed, for example). In S230, a feed direction is temporarily decided again. In the case where it is determined in S240 that the calculated chatter vibration increase width is equal to or less than the allowable value for all the locations of machining (S240: Yes), the process proceeds to S250. Next, in S250, machining conditions such as the feed rate, the feed direction, the cutting depth d, the pick feed p, and the tool attitude are decided for each location of machining. As discussed later, machining conditions for particular positions of machining at which machining cannot be performed under constant machining conditions, such as a corner portion of a product, are not calculated in S250. In the case where the feed direction is varied as in the arcuate feed discussed above, such positions of machining may be treated as the particular positions of machining.

Next, in S260, machining conditions for positions of machining such as a corner portion of a product are calculated in such a range that the chatter vibration increase width does not exceed the allowable value. For positions of machining at which machining cannot be performed under conditions temporarily decided in S220 or using the feed direction decided in S230 and the machining conditions or the feed direction varies, for example a position of machining at the start of feed, a position of machining at the end of feed, or a position of machining at a corner portion, conditions such as the cutting depth are calculated with reference to a position of machining at which the stability becomes the lowest, among varying conditions, as machining conditions different from those decided in S250, for example, to select a machining feed direction. Also in this case, it is necessary to suppress occurrence of chatter vibration. Therefore, in S260, machining conditions are calculated such that the value of the chatter vibration increase width does not exceed the allowable value in consideration of the allowable value of the chatter vibration increase width. For example, machining conditions under which machining is performed a plurality of times with the cutting depth gradually increased, machining conditions under which cutting is performed little by little with an arc larger than the nose radius of the tool, etc. are conceivable. Machining conditions must be set such that the chatter vibration increase width does not exceed the allowable value. The machining conditions thus decided in S250 and S260 are input to the tool path etc. calculation section 32. A tool path etc. is calculated by the tool path etc. calculation section 32, and output to the outside via the output section 34. Here, machining conditions and a feed direction are decided for all the locations of machining, and thereafter a tool path is calculated. However, machining conditions and a feed direction may be decided during calculation of a tool path for each location of machining.

Figure 9A:
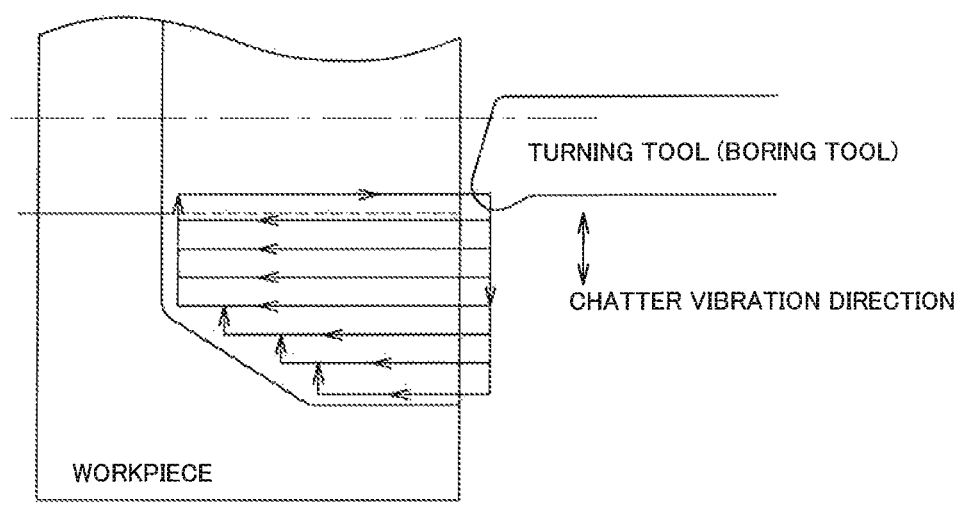
FIG. 9 is a schematic view illustrating a tool path with respect to a workpiece and the positional relationship between a tool and a machined portion of the workpiece during boring, in which FIG. 9 (a) shows a tool path according to the related art, FIG. 9 (b) shows the positional relationship between the tool and the machined portion of the workpiece in the tool path according to the related art, FIG. 9 (c) shows the positional relationship between the tool and the machined portion of the workpiece in a tool path calculated in accordance with the second embodiment, and FIG. 9 (d) shows a tool path calculated by applying the second embodiment.
Figure 9C:
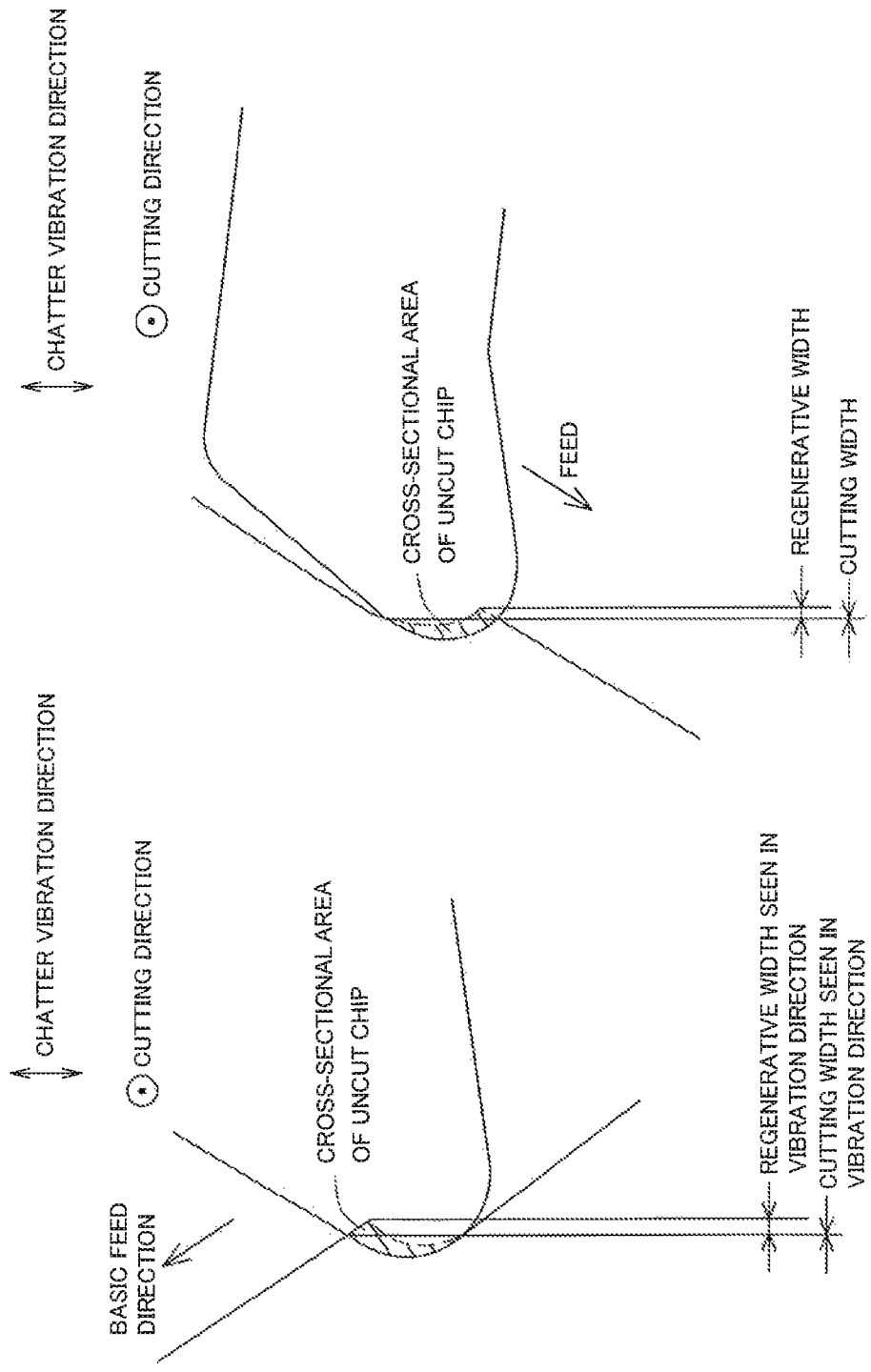
Figure 9D:
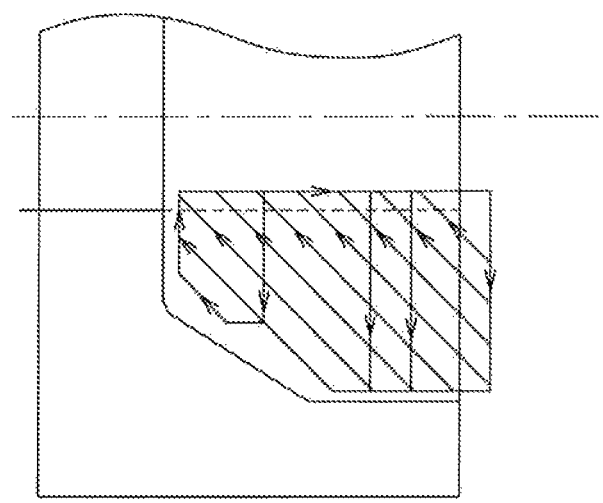

An example of the tool path calculated in accordance with the second embodiment will be described below. While the second embodiment is an embodiment for ball end milling, the example of the tool path described below is a tool path for boring. FIG. 9 is a schematic view illustrating a tool path with respect to a workpiece and the positional relationship between a tool and a machined portion (cross section of the uncut chip) of the workpiece during boring, in which FIG. 9(a) shows a tool path according to the related art, FIG. 9(b) shows the positional relationship between the tool and the machined portion of the workpiece in the tool path according to the related art, FIG. 9(c) shows the positional relationship between the tool and the machined portion of the workpiece in a tool path calculated in accordance with the second embodiment, and FIG. 9(d) shows a tool path calculated by applying the second embodiment. In the example, chatter vibration is caused on the tool side, and the direction of chatter vibration corresponds to the up-down direction of the drawing as indicated in FIG. 9(a).

As shown in FIG. 9, in the case where boring is performed on the outer peripheral side with respect to the broken line, a common boring tool is projected significantly in the axial direction of a rotary spindle. Therefore, it is considered that the boring tool has low rigidity and tends to vibrate in two directions perpendicular to the rotational axis direction. Thus, the operator estimates that the cutting direction (normally, y direction for a lathe) and the cutting depth direction (normally, x direction for a lathe), which are two directions perpendicular to the axial direction (normally, z direction for a lathe), are the direction of vibration, and inputs the estimated directions to the tool path generation device 2. In a tool path calculated by the tool path generation device according to the related art, as shown in FIG. 9(a), the basic feed direction is set to the z direction or the x direction. Therefore, as shown in FIG. 9(b), the cutting width (regenerative width) seen in the vibration direction has a considerable value, and the chatter vibration direction (which includes two directions in this case and thus may also be called a chatter vibration plane) and a plane including both the direction of extension of the cutting width and the cutting direction are not parallel to each other. In the embodiment, in contrast, the feed direction is set to the direction indicated in FIG. 9(c). This makes the direction of chatter vibration and a plane including both the direction of extension of the cutting width and the cutting direction parallel to each other by reducing the value of the cutting width (regenerative width) seen in the vibration direction to be as small as possible, that is, by causing the direction of chatter vibration and the direction of extension of the cutting width to coincide with each other. Thus, even if the tool should vibrate in the chatter vibration direction, variations in cross-sectional area of the uncut chip are small, and a reduced dynamic cutting force which increases chatter vibration is caused. In FIG. 9(c), two feed directions are indicated. For each of the feed directions, the chatter vibration direction and a plane including both the direction of extension of the cutting width and the cutting direction are parallel to each other. Therefore, selection of one of the feed directions may be decided such that the overall machining time or path distance including a return operation is short. FIG. 9(d) shows a tool path for a case where the feed direction in the left part of FIG. 9(c) is selected.

Thus, the tool path generation device 2 according to the second embodiment of the present invention selects the feed rate as machining conditions, decides the cutting depth d etc. on the basis of the feed rate, and calculates a tool path etc. on the basis of such values. Therefore, it is possible to calculate a tool path that provides a high machining efficiency with suppressed occurrence of chatter vibration. In the second embodiment, a machining condition decision method for a case where the chatter vibration direction is specified but none of the vibration characteristics of the machine tool device 8 including the tool and the workpiece and the magnitude and the direction of the specific cutting resistance is specified is described. However, the same machining condition decision method as that of the second embodiment may also be adopted in the case where the vibration characteristics are specified in addition to the chatter vibration direction but the magnitude and the direction of the specific cutting resistance are not specified. This is because the machining condition decision method according to the second embodiment is more convenient than a method of calculating a tool path in consideration of both the chatter vibration direction and the vibration characteristics, and enables easy calculation of a tool path. It should be understood that the embodiment can also be applied to a case where the magnitude and the direction of the specific cutting resistance are specified in addition to the direction of chatter vibration. In the tool path generation device 2 according to the embodiment, a section that selects a maximum feed rate in S210 constitutes the feed rate select section, a section that decides a basic feed direction in S230 constitutes the stabilizing feed direction decision section, a section that calculates a chatter vibration increase width in S240 constitutes the affecting value calculation section, the chatter vibration increase width constitutes the chatter vibration affecting value, and a section that selects a machining feed direction in S260 constitutes the machining feed direction select section.

In addition, the same machining condition decision method as that of the second embodiment may also be adopted in the case where none of the chatter vibration direction and the magnitude and the direction of the specific cutting resistance is specified but the vibration characteristics of the machine tool device 8 including the tool and the workpiece are specified. In this case, the chatter vibration direction is not specified, but the vibration direction can be extracted from a transfer function (compliance transfer function for the tool or the workpiece at the location of machining) matrix corresponding to the vibration characteristics of the machine tool device 8, and a feed direction can be decided with the extracted vibration direction considered as the chatter vibration direction. This method will be described below.

First, the following matrix is considered as the transfer function matrix.

$$\begin{bmatrix} Gxx(s) & Gxy(s) & Gxz(s) \\ Gyx(s) & Gyy(s) & Gyz(s) \\ Gzx(s) & Gzy(s) & Gzz(s) \end{bmatrix}$$ [Formula 1]

Each element of the transfer function matrix, for example $G_{xz}(s)$, represents the degree, the frequency, and the phase delay of vibration in the x direction caused in response to an excitation force in the z direction. s is a Laplace operator. In the case where transfer functions for all the directions in which the rigidity can be low (the transfer function can be high) are given as provided above, eigenvalue analysis is performed on the matrix for each frequency, for example, to calculate an eigenvector and an eigenvalue. The eigenvector represents the direction (reference coordinates) of the vibration mode, and the eigenvalue indicates the compliance of reference vibration. A method of calculating an eigenvector and an eigenvalue will be described below.

In the case where the machine tool device including the tool and the workpiece is excited in the direction in which vibration is most easily caused, the machine tool device is vibrated in the direction in which vibration is most easily caused. If the machine tool device is excited in a direction shifted from the direction in which vibration is most easily caused, however, the machine tool device is not vibrated in the direction of excitation, and the vibration direction is shifted into the direction in which vibration is most easily caused. Consequently, if the displacement vector is defined as X, the transfer function matrix is defined as G, and the excitation force vector is defined as F, and the relation X=G*F is established, one of the vectors F with which X is a scalar multiple (λ times) of F, that is, not a zero vector and that meets λ*F=G*F, corresponds to an excitation force in the direction in which vibration is most easily caused. When the equation is solved, λ corresponds to the eigenvalue (compliance), and F corresponds to the eigenvector. All (for the above three-dimensional matrix, three) eigenvalues and eigenvectors are calculated for all the frequencies, and one of the eigenvectors with which the eigenvalue (compliance) becomes maximum can be estimated as the direction of chatter vibration. The eigenvector represents the direction of the vibration mode, and the magnitude of the eigenvector is meaningless.

In the method of calculating the vibration direction discussed above, the case where the compliance becomes maximum may be a case where the magnitude of the compliance represented by a complex number becomes maximum (resonance frequency). In the method, the compliance is proportional to the degree of ease with which self-excited chatter vibration mainly of the mode coupling type is caused. Meanwhile, the vibration direction can be estimated as the direction for a case where the absolute value of the minimum value of the real part of the compliance (largest negative real part) becomes maximum as well. In the method, the compliance is proportional to the degree of ease with which self-excited chatter vibration mainly of the regenerative type is caused. Thus, in estimating the vibration direction, it is possible to change how to evaluate the value of the compliance depending on the machining method. For example, it is known that turning often causes chatter vibration of the regenerative type, and milling often causes chatter vibration of a combination of the two types. Thus, even in the case where the direction of chatter vibration is not specified, the direction of chatter vibration can be extracted from the vibration characteristics of the machine tool device 8 to decide a feed direction during machining.

The method of specifying or estimating the direction of chatter vibration includes the following method. For example, the operator sees the tool and its fixation member (tooling), the workpiece and its fixation member (chuck or jig), and the machine tool (such as an elongated spindle portion, a ram portion, and a column portion) to specify or estimate the direction in which vibration is easily caused as the chatter vibration direction by exercising his or her experience and sensation. In the case where it is specified or estimated that the workpiece is easily vibrated, the vibration direction may be varied among the locations of machining. Therefore, it is necessary to input the direction of vibration for all the locations of machining for which it is desired to consider chatter vibration. In addition, if shape data such as CAD data (and desirably material data in addition) are provided for a structure considered to have the lowest dynamic rigidity, a resonant mode can be predicted by the finite element method, for example, to predict the direction of vibration. In specifying or estimating the direction of chatter vibration, in a multiaxis machine tool including a rotary control spindle, it is also necessary to input the position, in the spindle configuration, of a structure estimated to cause chatter vibration. For example, in a three-axis controlled machine tool having x, y, and z translational axes, it is only necessary to specify or estimate the direction of chatter vibration. However, a multiaxis machine tool having four, five, etc. axes including a rotary control spindle also needs information on whether the direction of chatter vibration caused when the workpiece is tilted relative to the tool is fixed with respect to the workpiece or fixed with respect to the tool.

(Third Embodiment: Machining Conditions are Decided on the Basis of Chatter Vibration Increase Width and Resultant Cutting Force)

Figure 10:
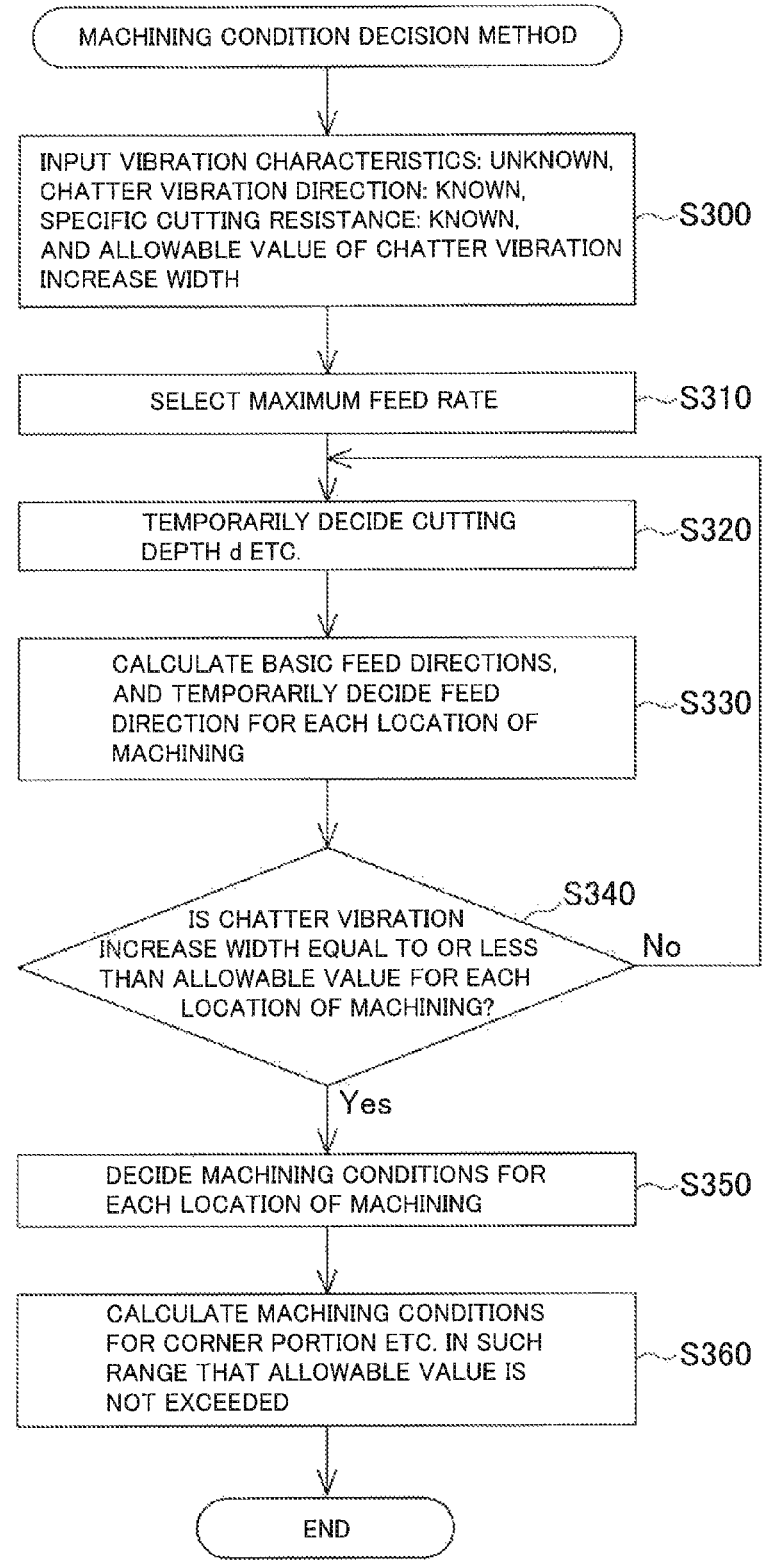
FIG. 10 is a flowchart illustrating a machining condition decision method according to a third embodiment of the present invention.

Next, a machining condition decision method used by the machining condition decision section 30 of the tool path generation device 2 according to a third embodiment of the present invention will be described with reference to FIG. 10. FIG. 10 is a flowchart illustrating a machining condition decision method according to the third embodiment. In the third embodiment, a feed direction is decided such that the direction of chatter vibration is the direction in which an increase in chatter vibration can be suppressed on the basis of the chatter vibration increase width discussed above. In the third embodiment, by way of example, it is assumed that the vibration characteristics of the machine tool device 8 including the tool and the workpiece are unknown, but that the direction of chatter vibration and the direction of the specific cutting resistance (on the same line as the direction of the resultant cutting force) are known.

In FIG. 10, in S300, the operator inputs information that the vibration characteristics of the machine tool device 8 including the tool and the workpiece are unknown, information that the direction of chatter vibration caused in the machine tool device 8 is specified or estimated (and information on the direction of vibration), and information that the direction of the specific cutting resistance of the workpiece against the tool is specified or estimated (and information on the direction of the specific cutting resistance). In addition, the allowable value of the chatter vibration increase width to be used in S360 is also input in S300. Next, in S310, the maximum feed rate is selected from a designated range of feed rate, and temporarily decided as machining conditions. Next, in S320, the cutting depth d, the pick feed p, and in the case of end milling performed using a multiaxis machine tool, the tool attitude are temporarily decided in consideration of an empirically known value, a value input by the operator, etc. The cutting depth d etc. is temporarily decided because such values are needed to decide a feed direction in S330 to be discussed later. Next, in S330, a feed direction of the tool with respect to the workpiece is temporarily decided. Here, the method of deciding a feed direction in S330 will be described.

In the tool path generation device according to the third embodiment, in deciding machining conditions, the direction of chatter vibration and the direction of the specific cutting resistance are known. Thus, in the third embodiment, a feed direction is calculated such that the direction of chatter vibration is a direction parallel to a plane including both the direction of the cutting width and the cutting direction or to a plane perpendicular to the direction of the resultant cutting force, or such that the direction of chatter vibration forms a small angle with each of the two planes discussed earlier. The chatter vibration increase width is represented by $B*\sin\theta_1*\sin\theta_2$. Thus, in S330, a basic feed direction that reduces the chatter vibration increase width is calculated. The basic feed direction is calculated so as to reduce the chatter vibration increase width as discussed above. Therefore, the feed direction is not limited to one direction, and a plurality of directions is calculated as the basic feed direction. Then, for each location of machining, in the case where any of the basic feed directions is appropriate, the appropriate direction is temporarily decided as the feed direction. In the case where none of the feed directions is appropriate, a direction close to the basic feed direction is decided as the feed direction.

Next, in S340, a chatter vibration increase width is calculated for each location of machining using the feed rate selected in S310, the cutting depth d etc. temporarily decided in S320, and the feed direction decided in S330, and it is determined whether or not the calculated chatter vibration increase width is equal to or less than the allowable value of the chatter vibration increase width input in S300. For a location of machining for which it is not determined in S340 that the calculated chatter vibration increase width is equal to or less than the allowable value (S340: No), the process proceeds to S320. In S320, a new cutting depth d etc. is temporarily decided. In S330, a feed direction is decided again. In the case where it is determined in S340 that the calculated chatter vibration increase width is equal to or less than the allowable value for all the locations of machining (S340: Yes), the process proceeds to S350. Next, in S350, machining conditions such as the feed rate, the feed direction, the cutting depth d, the pick feed p, and the tool attitude are decided for each location of machining. As discussed later, machining conditions for particular positions of machining, such as a corner portion of a product, are not calculated in S350.

Next, in S360, machining conditions for positions of machining such as a corner portion of a product are calculated in such a range that the chatter vibration increase width does not exceed the allowable value to select a machining direction. The machining conditions thus decided in S350 and S360 are input to the tool path etc. calculation section 32. A tool path etc. is calculated by the tool path etc. calculation section 32, and output to the outside via the output section 34.

Figure 11C:
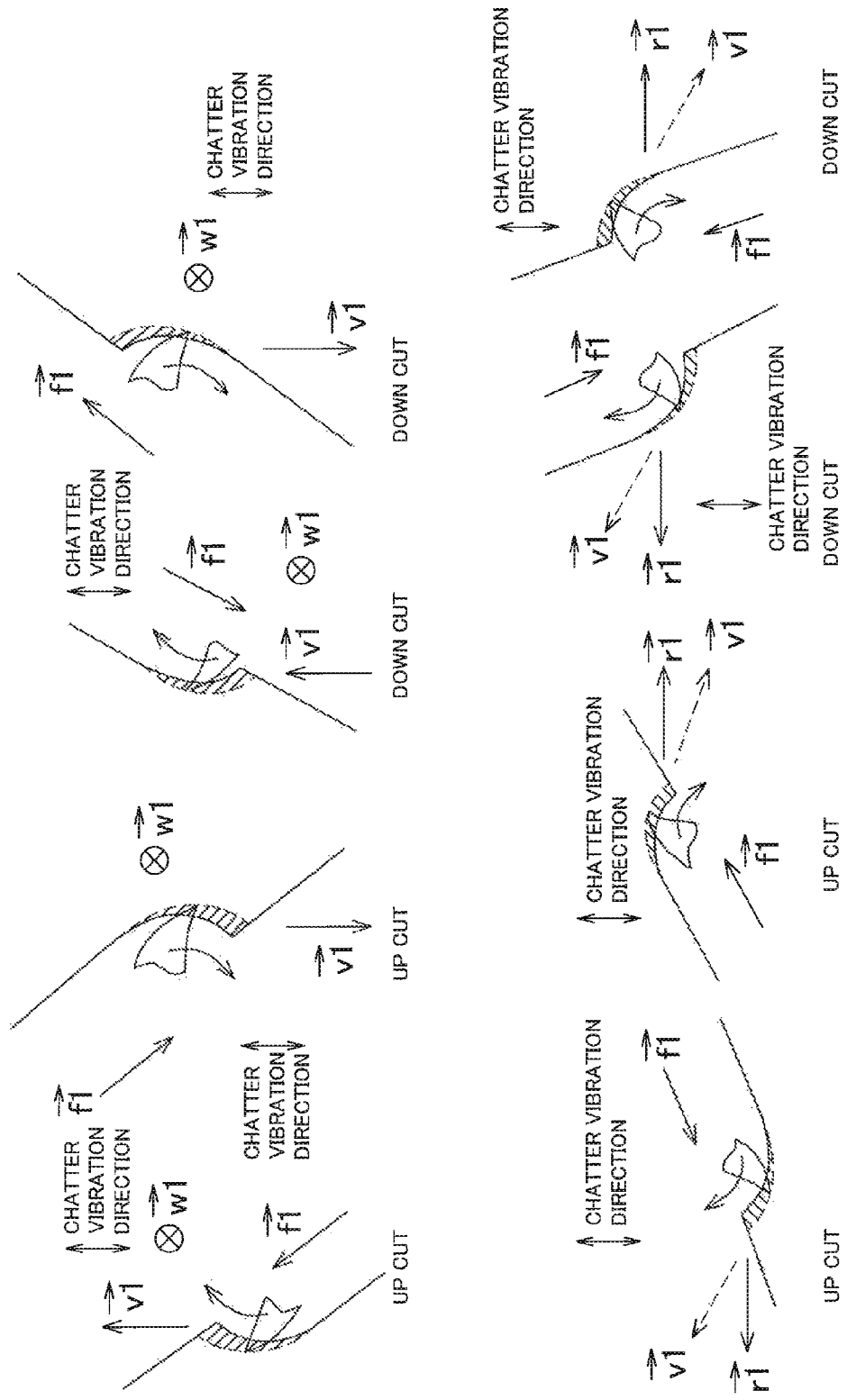
FIG. 11 is a schematic view illustrating a tool path with respect to a workpiece and the positional relationship between a tool and a machined portion of the workpiece during end milling, in which FIG. 11 (a) shows a tool path according to the related art, FIG. 11 (b) shows the positional relationship between the tool and the machined portion of the workpiece in the tool path according to the related art, FIG. 11 (c) shows the positional relationship between the tool and the machined portion of the workpiece in a tool path calculated in accordance with the third embodiment, and FIG. 11 (d) shows a tool path calculated in accordance with the third embodiment.
Figure 11D:
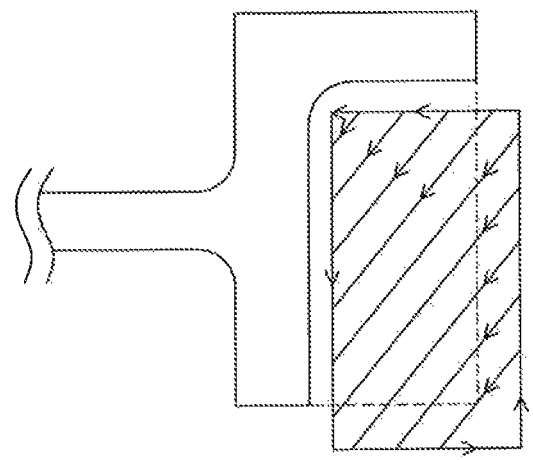

An example of the tool path calculated by applying the third embodiment will be described below. While the third embodiment is an embodiment for ball end milling, the example of the tool path described below is a tool path for end milling in which the helix angle is zero. FIG. 11 is a two-dimensional schematic view illustrating a tool path with respect to a workpiece and the positional relationship between a tool and a machined portion of the workpiece during end milling, in which FIG. 11(a) shows a tool path according to the related art, FIG. 11(b) shows the positional relationship between the tool and the machined portion of the workpiece in the tool path according to the related art, FIG. 11(c) shows the positional relationship between the tool and the machined portion of the workpiece in a basic feed direction calculated in accordance with the third embodiment, and FIG. 11(d) shows a tool path based on one feed direction calculated in accordance with the third embodiment. In the example, chatter vibration is caused in the workpiece, and the direction of chatter vibration corresponds to the up-down direction of the drawing as indicated in FIG. 11(a).

In the case of a tool path shown in FIG. 11(a), as shown in FIG. 11(b), the basic feed direction of the tool is the direction of a vector $f_1$, and the average cutting direction of cutting performed by one cutting edge of the tool corresponds to a vector $v_1$. In addition, the direction of the average resultant cutting force corresponds to a vector $r_1$, and the direction of the cutting width corresponds to a vector $w_1$, the direction of which is perpendicular to the drawing sheet surface.

As shown in FIG. 11, in the case where two-dimensional end milling is performed, a tool path for one-axis table feed, or that matches the plane orientation of the final shape, is used in the related art. In the tool path calculated by the tool path generation device according to the related art shown in FIG. 11(a), as shown in FIG. 11(b), the chatter vibration direction and the average cutting direction (vector $v_1$) do not coincide with each other, and the chatter vibration direction and the average direction of the resultant cutting force (vector $r_1$) are not orthogonal to each other. In the tool path according to the embodiment, in contrast, the feed direction may be set to the direction indicated in the two upper illustrations of FIG. 11(c). This causes the chatter vibration direction and the average cutting direction (vector $v_1$) to coincide with each other so that the direction of chatter vibration and a plane including both the direction of the cutting width and the cutting direction are parallel to each other. Thus, even if the workpiece should vibrate in the chatter vibration direction, variations in cross-sectional area of the uncut chip are small, and a reduced dynamic cutting force which increases chatter vibration is caused. The illustration shown in the upper left of FIG. 11(c) shows a state in which the tool performs up cut on the workpiece, and the illustration shown in the upper right of FIG. 11(c) shows a state in which the tool performs down cut on the workpiece. In deciding the feed direction, it is also considered whether up cut or down cut is performed. Selection between up cut and down cut may be performed in accordance with input from the operator.

In the tool path according to the embodiment, in addition, the feed direction may be set to the direction indicated in the two lower illustrations of FIG. 11(c). This causes the direction of chatter vibration and a plane perpendicular to the average direction of the resultant cutting force (vector $r_1$) to be parallel to each other. Thus, even if the workpiece is vibrated in the chatter vibration direction, a force component of the average resultant cutting force in the chatter vibration direction becomes zero, which suppresses an increase in chatter vibration. The illustration shown in the lower left of FIG. 11(c) shows a state in which the tool performs up cut on the workpiece, and the illustration shown in the lower right of FIG. 11(c) shows a state in which the tool performs down cut on the workpiece. In deciding the feed direction, it is also considered whether up cut or down cut is performed.

Thus, the tool path generation device 2 according to the third embodiment of the present invention selects the feed rate as machining conditions, decides the cutting depth d etc. on the basis of the feed rate, and calculates a tool path etc. on the basis of such values. Therefore, it is possible to calculate a tool path that provides a high machining efficiency with suppressed occurrence of chatter vibration. In the embodiment, in addition, the direction of the resultant cutting force is known compared to the second embodiment. Therefore, the number of options for the basic feed direction is increased, which enables calculation of a tool path that provides a high machining efficiency with further suppressed occurrence of chatter vibration. In the tool path generation device 2 according to the embodiment, a section that selects a maximum feed rate in S310 constitutes the feed rate select section, a section that calculates a chatter vibration increase width in S340 constitutes the affecting value calculation section, the chatter vibration increase width constitutes the chatter vibration affecting value, and a section that selects a machining feed direction in S360 constitutes the machining feed direction select section.

In the embodiment, a machining condition decision method for a case where the chatter vibration direction and the direction of the specific cutting resistance are specified but the vibration characteristics are not specified is described. However, the machining condition decision method according to the embodiment may also be used in the case where the direction of the specific cutting resistance is not known, by estimating the direction of the specific cutting resistance by the method described below.

For example, the direction of the specific cutting resistance can be estimated through analysis. For example, the direction of a machining force can be calculated on the basis of the tool shape and the friction coefficient (if unknown, a value of 0.5 may be used, which results in a slight error). Specifically, the direction of the resultant cutting force can be estimated on the basis of the tool shape, the chip flow direction, and the friction coefficient (or the component force ratio), and the chip flow direction can be calculated empirically on the basis of the tool shape using the empirical rules of Colwell or Stabler. For the friction coefficient, a database may be constructed using information on the workpiece and the tool, or a value of about 0.5 may be used empirically. The friction coefficient can also be estimated by preparing a graph having a horizontal axis indicating the rake angle of the tool and a vertical axis indicating the friction coefficient (labeled as Very small (0.1) at the lower end and as Very large (0.8) at the upper end, for example), and allowing the operator to specify one point on the graph. When the chip flow direction and the friction coefficient are known in this way, it is possible to estimate on the basis of the tool shape a friction force in the direction opposite to the chip flow direction, a normal force in the direction perpendicular to the rake face of the tool, and the direction of the resultant cutting force as the resultant of such forces. The direction of the resultant cutting force can also be estimated on the basis of the friction coefficient and the tool shape through analysis in which a cutting model is used.

(Fourth Embodiment: Machining Conditions are Decided on the Basis of Machining Process Gain)

Figure 12:
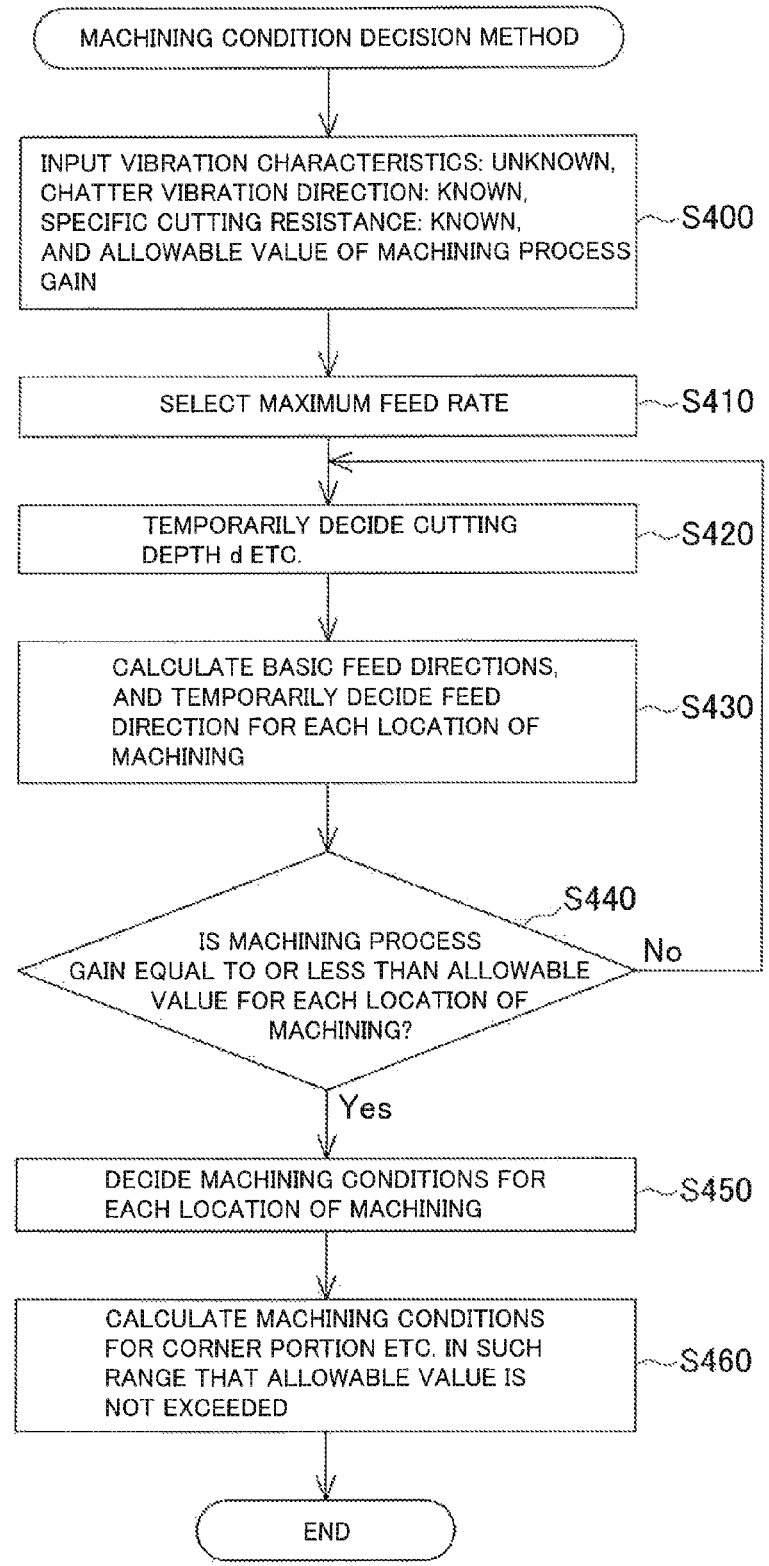
FIG. 12 is a flowchart illustrating a machining condition decision method according to a fourth embodiment of the present invention.

Next, a machining condition decision method used by the machining condition decision section 30 of the tool path generation device 2 according to a fourth embodiment of the present invention will be described with reference to FIG. 12. FIG. 12 is a flowchart illustrating a machining condition decision method according to the fourth embodiment. In the fourth embodiment, as in the third embodiment, by way of example, it is assumed that the vibration characteristics of the machine tool device 8 including the tool and the workpiece are unknown, but that the direction of chatter vibration and the magnitude and the direction of the specific cutting resistance are known. In the second and third embodiments, a feed direction is decided such that the direction of chatter vibration is a direction parallel to a particular plane or the angle formed between the direction of chatter vibration and a particular plane is small. In the embodiments, it is considered that a feed direction that qualitatively reduces the machining process gain of the machining system is selected. In the fourth embodiment, in contrast, machining conditions are decided by selecting a feed direction etc. that reduces the value of the machining process gain. The value of the machining process gain is an example of the value that affects increase and decrease in chatter vibration.

In the fourth embodiment, vibration characteristics G are unknown, and therefore it is impossible to quantitatively calculate the gain margin of the machining system. However, the direction of chatter vibration is specified, and therefore it is only necessary to consider vibration in the specified direction. The machining system has an open-loop transfer function of less than 1, and is more stable as the open-loop transfer function is farther below 1. Thus, the machining system is more stable as the machining process gain has a smaller value. Thus, in the case where the direction of chatter vibration is specified, a combination of the feed direction, the cutting depth, and the pick feed that can provide increased stability and a high machining efficiency can be decided by calculating only a component of the machining process gain in the chatter vibration direction and by comparing the calculated component.

In FIG. 12, in S400, the operator inputs information that the vibration characteristics of the machine tool device 8 including the tool and the workpiece are unknown, information that the direction of chatter vibration caused in the machine tool device 8 is specified or estimated, and information that the magnitude and the direction of the specific cutting resistance of the workpiece against the tool are specified or estimated (and information on the direction). In addition, the allowable value of the machining process gain to be used in S440 is also input in S400. In S400, it is assumed that information that one direction is specified as the direction of chatter vibration (and information on the direction of chatter vibration) is input. Next, in S410, the maximum feed rate is selected from a designated range of feed rate, and temporarily decided as machining conditions. Next, in S420, the cutting depth d, the pick feed p, and in the case of a multiaxis machine tool, the tool attitude are temporarily decided in consideration of an empirically known value, a value input by the operator, etc. The cutting depth d etc. is temporarily decided because such values are needed to decide a feed direction in S430 to be discussed later. Next, in S430, a feed direction of the tool with respect to the workpiece is temporarily decided. Next, in S440, a machining process gain is calculated for each location of machining using the feed rate selected in S410, the cutting depth d etc. temporarily decided in S420, and the feed direction temporarily decided in S430, and it is determined whether or not the calculated machining process gain is equal to or less than the allowable value of the machining process gain input in S400. Here, the method of calculating a machining process gain will be described below.

In the case where it is expected that chatter vibration in the w axis direction of FIG. 3 is caused between the workpiece 22 and the ball end mill 20, for example, it is only necessary to consider a component $P_w$ of the machining process gain in the w axis direction. The value is provided as the proportion of the dynamic cutting force $f_w$ in the w axis direction caused by regenerative displacement $\Delta w$ in the w axis direction. That is, $P_w = f_w/\Delta w$. In ball end milling, $P_w$ is fluctuated in accordance with the rotational angle of the tool. Normally, it can be considered that chatter vibration is not significantly fluctuated in synchronization with rotation of the tool. Thus, it is known that the machining process gain may be approximated by the average value of $P_w$. Thus, the machining process gain can be approximately calculated by analytically (or empirically) calculating the average value of a component in the w axis direction of an increment in cutting force caused in the case where minute displacement in the w axis direction is caused between the ball end mill 20 and the workpiece 22 under such cutting conditions in FIG. 3.

For a location of machining for which it is not determined in S440 that the calculated machining process gain is equal to or less than the allowable value (S440: No), the process proceeds to S420. In S420, a new cutting depth d etc. is temporarily decided. In S430, a feed direction is decided again. In the case where it is determined in S440 that the calculated machining process gain is equal to or less than the allowable value for all the locations of machining (S440: Yes), the process proceeds to S450. Next, in S450, machining conditions such as the feed rate, the feed direction, the cutting depth d, the pick feed p, and the tool attitude are decided for each location of machining. Next, in S460, machining conditions for locations of machining such as a corner portion of a product are calculated in such a range that the machining process gain does not exceed the allowable value to select a machining feed direction. The decided or calculated machining conditions are input to the tool path etc. calculation section 32. A tool path etc. is calculated by the tool path etc. calculation section 32, and output to the outside via the output section 34.

Thus, the tool path generation device 2 according to the fourth embodiment of the present invention calculates a machining process gain, and decides machining conditions in such a range that the machining process gain does not exceed the allowable value. Therefore, it is possible to calculate a tool path that provides a high machining efficiency with suppressed occurrence of chatter vibration. In the embodiment, in addition, it is important that a feed direction that provides a higher machining efficiency can be calculated by specifying the direction of chatter vibration. In the case where there is a lot to be cut between the shape of a material before machining and the final shape of a product, a tool path that provides a high machining efficiency can be generated by first preferentially selecting a feed direction that provides the highest machining efficiency in rough machining, and then preferentially selecting a feed direction that provides the highest machining efficiency from paths along the machined surface. In addition, in the case where one direction is specified as the direction of chatter vibration as discussed above, the machining process gain is a simple scholar, and therefore calculation of a machining process gain is also simplified. In the tool path generation device 2 according to the embodiment, a section that selects a maximum feed rate in S410 constitutes the feed rate select section, a section that calculates a machining process gain in S440 constitutes the affecting value calculation section, the machining process gain constitutes the chatter vibration affecting value, and a section that selects a machining feed direction in S460 constitutes the machining feed direction select section.

In the embodiment discussed above, the direction of chatter vibration is the w axis direction. In the case where chatter vibration is caused in two directions, for example in x and y axis directions, it is only necessary to consider components $f_x$ and $f_y$ of the dynamic cutting force in the x and y axis directions caused by regenerative displacement $\Delta x$ and $\Delta y$ in the x and y axis directions in FIG. 3. At this time, each element of the machining process gain is given by the proportions of $f_{xx}$, $f_{yx}$ caused by $\Delta x$, that is, $P_{xx} = f_{xx}/\Delta x$, $P_{yx} = f_{yx}/\Delta x$, and by the proportions of $f_{xy}$, $f_{yy}$ caused by $\Delta y$, that is, $P_{xy} = f_{xy}/\Delta y$, $P_{yy} = f_{yy}/\Delta y$. As discussed above, in order to evaluate the magnitude of the machining process gain, it is necessary to calculate the average value of the P matrix, and then to evaluate the magnitude of the matrix. Here, what matters is the multiplication factor $((f_x^2+f_y^2)^{1/2}/(\Delta x^2+\Delta y^2)^{1/2})$ between the magnitude of the regenerative displacement vector $((\Delta x^2+\Delta y^2)^{1/2})$ and the magnitude of the dynamic cutting force $((f_x^2+f_y^2)^{1/2})$. The multiplication factor can be calculated by allowing the operator to input the ratio between chatter vibrations in the x and y directions, or simply by using $\Delta x:\Delta y=1:1$. For example, in the case where the ball end mill is elongated and has low rigidity, it is assumed that vibrations caused in the x and y directions are at the same level as each other. Therefore, by using $\Delta x:\Delta y=1:1$, the magnitude of the machining process gain can be compared on the basis of $(f_x^2+f_y^2)^{1/2}/(\Delta x^2+\Delta y^2)^{1/2} = (((P_{xx}+P_{xy})^2+(P_{yx}+P_{yy})^2)/2)^{1/2}$. Thus, the machining process gain can be approximately calculated by analytically (or empirically) calculating the average values of components in the x and y axis directions of an increment in cutting force caused in the case where minute displacement in the x and y axis directions is caused between the ball end mill 20 and the workpiece 22 under such cutting conditions in FIG. 3. A combination of the feed direction, the cutting depth d, and the pick feed p that can provide a high machining efficiency with the magnitude of the machining process gain equal to or less than the allowable value etc. is decided. Further in this case, computation for deciding machining conditions is simplified by considering only the machining process gain in the vibration directions.

In the case where chatter vibration is caused in three directions, namely x, y, and z axis directions, components $f_x$, $f_y$, and $f_z$ of the dynamic cutting force in the x, y, and z axis directions caused by regenerative displacement $\Delta x$, $\Delta y$, and $\Delta z$ in the x, y, and z axis directions are considered in FIG. 3. At this time, each element of the machining process gain is given by the proportions of components $f_{xx}$, $f_{yx}$, $f_{zx}$ of the dynamic cutting force in the x, y, and z axis directions caused by regenerative displacement $\Delta x$ in the x axis direction ($P_{xx} = f_{xx}/\Delta x$, $P_{yx} = f_{yx}/\Delta x$, $P_{zx} = f_{zx}/\Delta x$), by the proportion of $f_{xy}$, $f_{yy}$, and $f_{zy}$ caused by $\Delta y$ ($P_{xy} = f_{xy}/\Delta y$, $P_{yy} = f_{yy}/\Delta y$, $P_{zy} = f_{zy}/\Delta y$), and by the proportion of $f_{xz}$, $f_{yz}$, and $f_{zz}$ caused by $\Delta z$ ($P_{xz} = f_{xz}/\Delta z$, $P_{yz} = f_{yz}/\Delta z$, $P_{zz} = f_{zz}/\Delta z$).

[Formula 2]

$$\begin{Bmatrix} f_{xx} & f_{xy} & f_{xz} \\ f_{yx} & f_{yy} & f_{yz} \\ f_{zx} & f_{zy} & f_{zz} \end{Bmatrix} = \begin{bmatrix} P_{xx} & P_{xy} & P_{xz} \\ P_{yx} & P_{yy} & P_{yz} \\ P_{zx} & P_{zy} & P_{zz} \end{bmatrix} \begin{Bmatrix} \Delta x & 0 & 0 \\ 0 & \Delta y & 0 \\ 0 & 0 & \Delta z \end{Bmatrix} \therefore$$

$$\begin{bmatrix} P_{xx} & P_{xy} & P_{xz} \\ P_{yx} & P_{yy} & P_{yz} \\ P_{zx} & P_{zy} & P_{zz} \end{bmatrix} = \begin{Bmatrix} f_{xx} & f_{xy} & f_{xz} \\ f_{yx} & f_{yy} & f_{yz} \\ f_{zx} & f_{zy} & f_{zz} \end{Bmatrix} \begin{Bmatrix} \dfrac{1}{\Delta x} & 0 & 0 \\ 0 & \dfrac{1}{\Delta y} & 0 \\ 0 & 0 & \dfrac{1}{\Delta z} \end{Bmatrix} =$$

$$\begin{Bmatrix} \dfrac{f_{xx}}{\Delta x} & \dfrac{f_{xy}}{\Delta y} & \dfrac{f_{xz}}{\Delta z} \\ \dfrac{f_{yx}}{\Delta x} & \dfrac{f_{yy}}{\Delta y} & \dfrac{f_{yz}}{\Delta z} \\ \dfrac{f_{zx}}{\Delta x} & \dfrac{f_{zy}}{\Delta y} & \dfrac{f_{zz}}{\Delta z} \end{Bmatrix}$$

As discussed above, in order to compare the magnitude of the machining process gain, the average value of the P matrix is calculated in the case where the matrix is varied over time, and then the magnitude of the matrix is evaluated on the basis of the multiplication factor $(f_x^2+f_y^2+f_z^2)^{1/2}/(\Delta x^2+\Delta y^2+\Delta^2)^{1/2}$ between the magnitude of the regenerative displacement vector $(\Delta x^2+\Delta y^2+\Delta^2)^{1/2}$ and the magnitude of the dynamic cutting force $(f_x^2+f_y^2+f_z^2)^{1/2}$. In order to calculate the multiplication factor, the ratio among chatter vibrations in the x, y, and z directions is necessary. If the ratio is defined as 1:b:c, the regenerative displacement vector is defined as $(\Delta x, \Delta y, \Delta z)=(\Delta x, b\Delta x, c\Delta x)$, and the magnitude of the regenerative displacement vector is defined as $(\Delta x^2+b^2\Delta x^2+c^2\Delta x^2)^{1/2}=\Delta x(1+b^2+c^2)^{1/2}$. Meanwhile, the dynamic cutting force is defined as $(P_{xx}\Delta x+P_{xy}\Delta y+P_{xz}\Delta z, P_{yx}\Delta x+P_{yy}\Delta y+P_{yz}\Delta z, P_{zx}\Delta x+P_{zy}\Delta y+P_{zz}\Delta z)=\Delta x(P_{xx}+P_{xy}b+P_{xz}c, P_{yx}+P_{yy}b+P_{yz}c, P_{zx}+P_{zy}b+P_{zz}c)$, and the magnitude of the dynamic cutting force is defined as $\Delta x((P_{xx}+P_{xy}b+P_{xz}c)^2+(P_{yx}+P_{yy}b+P_{yz}c)^2+(P_{zx}+P_{zy}b+P_{zz}c)^2)^{1/2}$. Thus, the multiplication factor between the magnitude of the regenerative displacement vector and the magnitude of the dynamic cutting force, that is, the magnitude of the machining process gain, can be calculated as $(((P_{xx}+P_{xy}b+P_{xz}c)^2+(P_{yx}+P_{yy}b+P_{yz}c)^2+(P_{zx}+P_{zy}b+P_{zz}c)^2)/(1+b^2+c^2))^{1/2}$. If the ratio among chatter vibrations is defined as 1:1:1, the multiplication factor is calculated as $(((P_{xx}+P_{xy}+P_{xz})^2+(P_{yx}+P_{yy}+P_{yz})^2+(P_{zx}+P_{zy}+P_{zz})^2)/3)^{1/2}$.

$$\begin{Bmatrix} f_x \\ f_y \\ f_z \end{Bmatrix} = \begin{bmatrix} P_{xx} & P_{xy} & P_{xz} \\ P_{yx} & P_{yy} & P_{yz} \\ P_{zx} & P_{zy} & P_{zz} \end{bmatrix} \begin{Bmatrix} \Delta x \\ \Delta y \\ \Delta z \end{Bmatrix} \therefore \text{With} \begin{Bmatrix} \Delta x \\ \Delta y \\ \Delta z \end{Bmatrix} = \Delta x \begin{Bmatrix} 1 \\ b \\ c \end{Bmatrix},$$

$$\begin{Bmatrix} f_x \\ f_y \\ f_z \end{Bmatrix} = \Delta x \begin{bmatrix} P_{xx} & P_{xy} & P_{xz} \\ P_{yx} & P_{yy} & P_{yz} \\ P_{zx} & P_{zy} & P_{zz} \end{bmatrix} \begin{Bmatrix} 1 \\ b \\ c \end{Bmatrix} = \Delta x \begin{Bmatrix} P_{xx}+P_{xy}b+P_{xz}c \\ P_{yx}+P_{yy}b+P_{yz}c \\ P_{zx}+P_{zy}b+P_{zz}c \end{Bmatrix}$$

[Formula 3]

Thus, the multiplication factor between the magnitudes of the input and output vectors is represented by the following formula.

$$\frac{\text{Magnitude of output vector}}{\text{Magnitude of input vector}} =$$

[Formula 4]

$$\frac{\Delta x \sqrt{\begin{array}{l}(P_{xx}+P_{xy}b+P_{xz}c)^2 + \\ (P_{yx}+P_{yy}b+P_{yz}c)^2 + \\ (P_{zx}+P_{zy}b+P_{zz}c)^2 \end{array}}}{\sqrt{\Delta x^2+(b\Delta x)^2+(c\Delta x)^2}} = \sqrt{\frac{\begin{array}{l}(P_{xx}+P_{xy}b+P_{xz}c)^2 + \\ (P_{yx}+P_{yy}b+P_{yz}c)^2 + \\ (P_{zx}+P_{zy}b+P_{zz}c)^2 \end{array}}{1+b^2+c^2}}$$

$$\text{With} \begin{Bmatrix} \Delta x \\ \Delta y \\ \Delta z \end{Bmatrix} = \Delta x \begin{Bmatrix} 1 \\ 1 \\ 1 \end{Bmatrix},$$

multiplication factor is $$\sqrt{\frac{(P_{xx}+P_{xy}+P_{xz})^2+(P_{yx}+P_{yy}+P_{yz})^2+(P_{zx}+P_{zy}+P_{zz})^2}{3}}$$

Thus, the machining process gain can be approximately calculated by analytically (or empirically) calculating the average values of components in the x, y, and z axis directions of an increment in cutting force caused in the case where minute displacement in the x, y, and z axis directions is caused between the ball end mill 20 and the workpiece 22 under such cutting conditions in FIG. 3. A combination of the feed direction, the cutting depth d, and the pick feed p that can provide a high machining efficiency with the magnitude of the machining process gain equal to or less than the allowable value etc. is decided.

In the fourth embodiment of the present invention, as discussed above, the vibration characteristics of the machine tool device 8 including the tool and the workpiece are unknown, and the chatter vibration stability limit cannot be specified accurately. Therefore, machining conditions cannot be calculated with the gain margin of the machining system equal to or more than 0 dB. Thus, in the embodiment, in order to suppress occurrence of chatter vibration, the allowable value (upper limit value) of the machining process gain that lowers the stability of chatter vibration is decided by an empirical determination performed by the operator etc., and machining conditions that are better (that basically provides a higher machining efficiency, which may be combined with keeping the machining resistance at the allowable value or less, providing a finished surface with little roughness, etc. as in the related art) are decided for each location of machining in such a range that the machining process gain does not exceed the allowable value. Since the vibration characteristics of the machine tool device 8 are unknown, it is necessary to input the allowable value from the outside. By deciding machining conditions (under which the magnitude of the machining process gain is brought closer to the allowable value) in consideration of the chatter vibration stability, the chatter vibration stability is maintained at the same level when any portion of the workpiece is machined, which prevents a useless reduction in machining efficiency.

(Fifth Embodiment: Machining Conditions are Decided on the Basis of Magnitude of Open-Loop Transfer Function)

Figure 13:
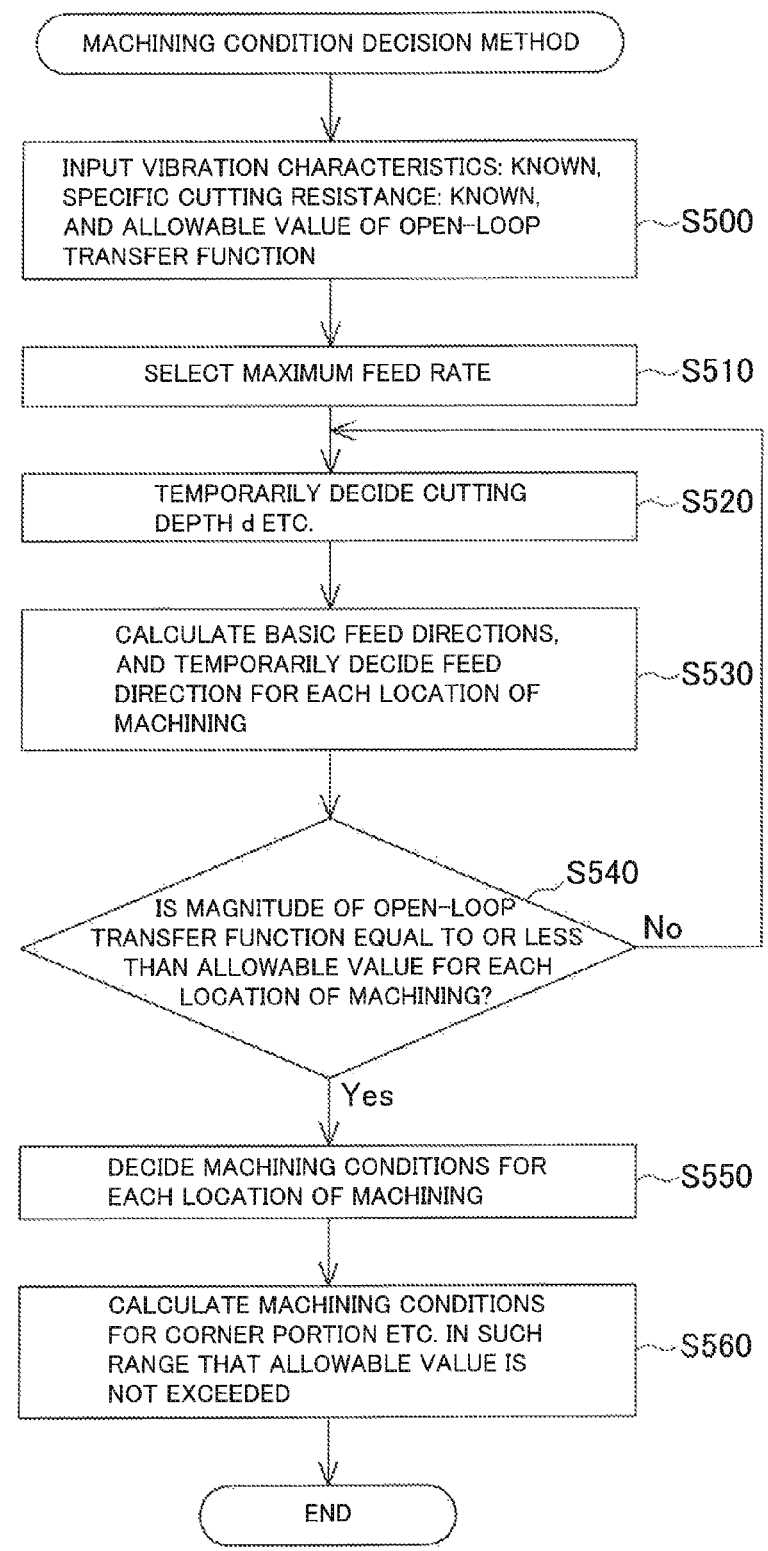
FIG. 13 is a flowchart illustrating a machining condition decision method according to a fifth embodiment of the present invention.

Next, a machining condition decision method used by the machining condition decision section of the tool path generation device 2 according to a fifth embodiment of the present invention will be described with reference to FIG. 13. FIG. 13 is a flowchart illustrating a machining condition decision method according to the fifth embodiment. In the fifth embodiment, by way of example, it is assumed that the vibration characteristics of the machine tool device 8 including the tool and the workpiece and the magnitude and the direction of the specific cutting resistance are all known. The direction of chatter vibration may be or may not be known.

In FIG. 13, in S500, the operator inputs information that the vibration characteristics of the machine tool device 8 including the tool and the workpiece are specified or estimated, and information that the magnitude and the direction of the specific cutting resistance of the workpiece against the tool are specified or estimated. In addition, the allowable value of the open-loop transfer function of the machining system used in S540 is also input in S500. Next, in S510, the maximum feed rate is selected from a designated range of feed rate, and temporarily decided as machining conditions. Next, in S520, the cutting depth d, the pick feed p, and in the case of end milling performed using a multiaxis machine tool, the tool attitude are temporarily decided in consideration of an empirically known value, a value input by the operator, etc. Next, in S530, a feed direction of the tool with respect to the workpiece is temporarily decided. Next, in S540, the magnitude of the open-loop transfer function of the machining system is calculated for each location of machining using the feed rate selected in S510, the cutting depth d etc. temporarily decided in S520, and the feed direction temporarily decided in S530, and it is determined whether or not the calculated magnitude of the open-loop transfer function is equal to or less than the allowable value.

In FIG. 4, each value of the matrix P serving as the machining process gain is varied in accordance with the values of the feed rate, the cutting depth d, the pick feed p, etc. Thus, here, machining conditions are decided by calculating the magnitude of the open-loop transfer function of the machining system (reciprocal of the gain margin), that is, the magnitude of $(1-e^{-Ts})PG$ (in the case where the overlapping rate $\mu \approx 1$), and examining whether or not the calculated value exceeds the allowable value. In calculating the open-loop transfer function of the machining system, values such as the vibration characteristics G of the machine tool device 8 including the tool and the workpiece and the specific cutting resistance of the workpiece 22 are used. In the case where the ranges of the cutting depth d and the pick feed p are specified by the operator using the input section 28, a combination of the cutting depth d and the pick feed p that provides a high machining efficiency is decided in consideration of the stability of chatter vibration in the ranges specified by the operator.

For a location of machining for which it is not determined in S540 that the magnitude of the calculated open-loop transfer function is equal to or less than the allowable value (S540: No), the process proceeds to S520. In S520, a new cutting depth d etc. is temporarily decided. In S530, a feed direction is temporarily decided again. In the case where it is determined in S540 that the calculated magnitude of the open-loop transfer function is equal to or less than the allowable value for all the locations of machining (S540: Yes), the process proceeds to S550. In S550, machining conditions such as the feed rate, the feed direction, the cutting depth d, the pick feed p, and the tool attitude are decided for each location of machining. Next, in S560, machining conditions for positions of machining such as a corner portion of a product are calculated in such a range that the open-loop transfer function does not exceed the allowable value to select a machining feed direction. The machining conditions thus decided in S550 and S560 are input to the tool path etc. calculation section 32. A tool path etc. is calculated by the tool path etc. calculation section 32, and output to the outside via the output section 34.

Thus, the tool path generation device 2 according to the fifth embodiment of the present invention decides machining conditions in consideration of the chatter vibration stability limit and so as to achieve a higher machining efficiency in the ranges specified by the operator. Therefore, it is possible to calculate a tool path that provides an improved machining efficiency of the machine tool device 8. This is because the machining efficiency is not lowered more than necessary for fear of occurrence of chatter vibration during machining. In addition, a tool path that provides high chatter vibration stability can be calculated through computation. Therefore, a tool path can be calculated easily compared to a case where a tool path is decided as a result of performing actual machining. In the tool path generation device 2 according to the embodiment, a section that selects a maximum feed rate in S510 constitutes the feed rate select section, a section that calculates an open-loop transfer function in S540 constitutes the affecting value calculation section, the open-loop transfer function constitutes the chatter vibration affecting value, and a section that selects a machining feed direction in S560 constitutes the machining feed direction select section.

The fifth embodiment enables accurate selection of the feed direction and decision of the cutting depth and the pick feed compared to the first to fourth embodiments. In the embodiment discussed above, the allowable value of the open-loop transfer function of the machining system is inputted, and machining conditions are decided in such a range that the open-loop transfer function does not exceed the allowable value. However, input of the allowable value is not an essential element. In the embodiment, machining conditions are decided on the basis of the value of the open-loop transfer function to allow accurate determination as to whether or not chatter vibration is caused. Therefore, machining conditions under which the open-loop transfer function is equal to or less than 1, that is, machining conditions under which the gain margin is equal to or more than 0 dB, may be set rather than allowing input of the allowable value. In this case, a tool path that provides a high machining efficiency can be calculated compared to a case where the allowable value of the open-loop transfer function is set to be small with a margin.

In the fifth embodiment, in addition, machining conditions can be decided in consideration of the chatter vibration stability limit, and the rotational speed of the ball end mill 20 can be more stable (with chatter vibration less likely to occur). In this case, the operator can input the range of the rotational speed of the main spindle of the ball end mill 20, and the magnitude of the open-loop transfer function can be computed for each rotational speed in the range to allow evaluation of the chatter vibration stability at each rotational speed. On the basis of such evaluation, the tool path generation device 2 can indicate to the operator machining conditions for the most stable rotational speed, or a plurality of relatively stable rotational speeds. The operator can select one of the plurality of rotational speeds in consideration of the machining efficiency and the tool wear, and the tool path generation device 2 can indicate machining conditions based on the selected rotational speed. In addition, the tool path generation device 2 itself can determine an optimum cutting speed (rotational speed) in consideration of the materials of the workpiece and the tool to calculate an appropriate rotational speed range on the basis of the radius of rotation.

In the fifth embodiment, in addition, machining conditions can be decided in consideration of an unconditional chatter vibration stability limit. By the term "unconditional chatter vibration stability limit", it is meant that the cutting depth of the ball end mill 20 is set to a value at which no chatter vibration is caused regardless of the rotational speed. With reference to the graph of FIG. 5, it is meant that the cutting depth is set to about 1.5 mm. In this case, the operator or the tool path generation device 2 can specify the rotational speed without considering occurrence of chatter vibration.

In the fifth embodiment, machining conditions are decided with the vibration characteristics of the machine tool device 8 including the tool and the workpiece known. However, a compliance transfer function in a low-rigidity direction may be measured for a structure of the machine tool device 8 considered to have the lowest dynamic rigidity, and the obtained compliance transfer function may be used as the vibration characteristics of the machine tool device 8. For example, in the case of a system in which an elongated end mill tool is used, it is considered that the end mill has low rigidity in two radial directions. Therefore, it is desirable to measure transfer functions in the two directions, to further measure a transfer function of an off-diagonal term component of the two directions, and to compute the magnitude of the open-loop transfer function. In the case where the machine tool device 8 has low rigidity only in one direction, meanwhile, a compliance transfer function only for the one direction may be calculated.

In the fifth embodiment, a machining condition decision method for a case where the vibration characteristics of the machine tool device 8 including the tool and the workpiece and the magnitude and the direction of the specific cutting resistance are known is described. However, the machining condition decision method according to the fifth embodiment may also be used in the case where the vibration characteristics of the machine tool device 8 and the magnitude and the direction of the specific cutting resistance are known and either the direction of chatter vibration is known or the direction of chatter vibration is not known. This is because the open-loop transfer function of the machining system can be derived in the case where the vibration characteristics of the machine tool device 8 and the magnitude and the direction of the specific cutting resistance are known even if the direction of chatter vibration is not known.

In the fifth embodiment, in addition, in deciding the vibration characteristics of the machine tool device 8, in the case where there is a database of information related to the shape etc. of the tool (which may include the material and the fixation method, and which may be represented by the model number) and the shape etc. of the workpiece, shapes close to the shape etc. of the tool and the shape etc. of the workpiece currently used may be selected from the database, and vibration characteristics corresponding to the selected information may be utilized as the vibration characteristics of the machine tool device 8. In actual machining, shapes that are similar to or the same as the shape etc. of the tool and the shape etc. of the workpiece used in the past are occasionally used. In such a case, the vibration characteristics used in the past may be used in the current machining to save the trouble of measuring the vibration characteristics. Constructing a database of information on machining performed in the past (the vibration characteristics, the chatter vibration direction, and the magnitude and the direction of the specific cutting resistance) is also useful for each of the embodiments discussed above.

REFERENCE SIGNS LIST

2 TOOL PATH GENERATION DEVICE
4 CAD DEVICE
6 NC PROGRAM PREPARATION DEVICE
8 MACHINE TOOL DEVICE
10 CPU
12 DISPLAY DEVICE
14 INPUT DEVICE
16 ROM
18 RAM
20 STORAGE DEVICE
22 INPUT/OUTPUT INTERFACE
28 INPUT SECTION
30 MACHINING CONDITION DECISION SECTION
32 TOOL PATH ETC. CALCULATION SECTION
34 OUTPUT SECTION

The invention claimed is:

1. A tool path generation device that calculates a tool path to be used by a machine tool device that machines a workpiece using at least one tool, said tool path generation device comprising:
   an affecting value calculation section that calculates a chatter vibration increase and decrease affecting value that affects increase and decrease in chatter vibration caused in a structure formed by the tool, the workpiece, and the machine tool device;
   a machining condition decision section that decides machining conditions based on the chatter vibration increase and decrease affecting value calculated by the affecting value calculation section, the machining conditions comprising at least one of feed direction, pick feed and tool attitude; and
   a tool path calculation section that calculates the tool path based on the machining conditions decided by the machining condition decision section, wherein:
   if a direction of the chatter vibration and the vibration characteristics of the structure are not known, the chatter vibration increase and decrease affecting value is based on a cutting width or a regenerative width,
   if a direction of the chatter vibration or vibration characteristics of the structure is known, the chatter vibration increase and decrease affecting value is based on the chatter vibration increase width, and
   wherein the machine tool uses the at least one tool to machine the workpiece with the calculated tool path.

2. The tool path generation device according to claim 1, wherein the cutting width and the regenerative width are included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool.

3. The tool path generation device according to claim 2, wherein the affecting value calculation section calculates the magnitude of the cutting width or the regenerative width as the chatter vibration increase and decrease affecting value in a case where none of the vibration characteristics of the structure, the direction of the chatter vibration, and a magnitude and a direction of a specific cutting resistance of the workpiece are specified or estimated.

4. The tool path generation device according to claim 2, wherein a machining system has high stability in a case where the magnitude of the cutting width or the regenerative width is small compared to a case where the magnitude of the cutting width or the regenerative width is large.

5. The tool path generation device according to claim 1, wherein when the direction of the chatter vibration or the vibration characteristics are known, the affecting value calculation section calculates, as the chatter vibration increase and decrease affecting value, a magnitude of a chatter vibration increase width that is based on at least one of:
   a first angle formed between:
      both:
         (a) a cutting direction of the tool; and
         (b) a direction between a direction of extension of a cutting width and a direction of extension of a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool, that is, a plane including both the direction (a) and the direction (b); and
the direction of the chatter vibration; and
a second angle formed between a plane perpendicular to a direction of a resultant cutting force applied from the tool to the workpiece during machining, and the direction of the chatter vibration.

6. The tool path generation device according to claim 5, wherein the chatter vibration increase width is calculated based on at least one of the first angle and the second angle and a magnitude of the cutting width or the regenerative width.

7. The tool path generation device according to claim 5, wherein the affecting value calculation section calculates the magnitude of the chatter vibration increase width as the chatter vibration increase and decrease affecting value in a case where at least the direction of the chatter vibration or the vibration characteristics of the structure are specified or estimated.

8. The tool path generation device according to claim 5, wherein a machining system has high stability in a case where the magnitude of the chatter vibration increase width is small compared to a case where the magnitude of the chatter vibration increase width is large.

9. The tool path generation device according to claim 1, wherein the affecting value calculation section calculates a magnitude of a machining process gain of a machining system of the structure as the chatter vibration increase and decrease affecting value when the direction of the chatter vibration and a magnitude and a direction of a specific cutting resistance of the workpiece are specified or estimated.

10. The tool path generation device according to claim 9, wherein the machining system has high stability in a case where the magnitude of the machining process gain is small compared to a case where the magnitude of the machining process gain is large.

11. The tool path generation device according to claim 1, wherein the affecting value calculation section calculates a magnitude of an open-loop transfer function of a machining system of the structure as the chatter vibration increase and decrease affecting value when the vibration characteristics are known.

12. The tool path generation device according to claim 11, wherein the affecting value calculation section calculates the magnitude of the open-loop transfer function as the chatter vibration increase and decrease affecting value in a case where all of the vibration characteristics of the structure and a magnitude and a direction of a specific cutting resistance of the workpiece are specified or estimated.

13. The tool path generation device according to claim 11, wherein the machining system is stable in a case where the magnitude of the open-loop transfer function is less than 1, the machining system is unstable in a case where the magnitude of the open-loop transfer function is more than 1, and the machining system has higher stability as the magnitude of the open-loop transfer function is smaller.

14. The tool path generation device according to claim 1, wherein:
the machining condition decision section includes a stabilizing feed direction decision section that decides a chatter vibration stabilizing feed direction based on the chatter vibration increase and decrease affecting value, the chatter vibration stabilizing feed direction being a feed direction of the tool with respect to the workpiece or of the workpiece with respect to the tool that does not increase the chatter vibration; and
the machining condition decision section decides machining conditions based on the chatter vibration stabilizing feed direction.

15. The tool path generation device according to claim 14, wherein the stabilizing feed direction decision section decides the stabilizing feed direction by deciding the feed direction such that an angle formed between:
at least one of:
a plane including both:
(a) a cutting direction of the tool; and
(b) a direction between a direction of extension of a cutting width and a direction of extension of a regenerative width, the cutting width and the regenerative width being included in a cross section of an uncut chip of the workpiece which is cut by the tool and which is perpendicular to a cutting direction of the tool, the cutting width being a width of a contour portion representing a surface newly generated as a result of current cutting performed by the tool, and the regenerative width being a width of a contour portion representing a surface generated as a result of previous cutting performed by the tool; and
a plane perpendicular to a direction of a resultant cutting force applied from the tool to the workpiece during machining; and
the direction of the chatter vibration is small.

16. The tool path generation device according to claim 14, wherein:
the machining condition decision section further includes a machining feed direction select section that selects a machining feed direction that is different from the chatter vibration stabilizing feed direction for a location at which machining cannot be performed using the chatter vibration stabilizing feed direction; and
the machining condition decision section decides machining conditions based on the chatter vibration stabilizing feed direction and the machining feed direction.

17. The tool path generation device according to claim 1, wherein:
the machining condition decision section further includes a feed rate select section that selects an upper limit value of an allowable feed rate as a feed rate of the tool with respect to the workpiece or of the workpiece with respect to the tool; and
the machining condition decision section decides machining conditions based on the feed rate selected by the feed rate select section.

18. A tool path generation method for calculating a tool path to be used by a machine tool device that machines a workpiece using at least one tool, the method comprising:
calculating a chatter vibration increase and decrease affecting value that affects increase and decrease in chatter vibration caused in a structure formed by the tool, the workpiece, and the machine tool device;
deciding machining conditions based on the calculated chatter vibration increase and decrease affecting value, the machining conditions comprising at least one of feed direction, pick feed and tool attitude; and calculating the tool path based on the decided machining conditions, wherein:
if a direction of the chatter vibration and the vibration characteristics of the structure are not known, the chatter vibration increase and decrease affecting value is based on a cutting width or a regenerative width,
if a direction of the chatter vibration or vibration characteristics of the structure is known, the chatter vibration increase and decrease affecting value is based on the chatter vibration increase width, and
wherein the machine tool uses the at least one tool to machine the workpiece with the calculated tool path.

19. A non-transitory computer readable medium containing a tool path generation program for calculating a tool path to be used by a machine tool device that machines a workpiece using at least one tool, the program comprising computer instructions which, when executed by a computer, perform a method that comprises:
calculating a chatter vibration increase and decrease affecting value that affects increase and decrease in chatter vibration caused in a structure formed by the tool, the workpiece, and the machine tool device;
deciding machining conditions based on the calculated chatter vibration increase and decrease affecting value, the machining conditions comprising at least one of feed direction, pick feed and tool attitude; and
calculating the tool path based on the decided machining conditions, wherein:
if a direction of the chatter vibration and the vibration characteristics of the structure are not known, the chatter vibration increase and decrease affecting value is based on a cutting width or a regenerative width,
if a direction of the chatter vibration or vibration characteristics of the structure is known, the chatter vibration increase and decrease affecting value is based on the chatter vibration increase width, and
wherein the machine tool uses the at least one tool to machine the workpiece with the calculated tool path.

* * * * *